Figure 1:
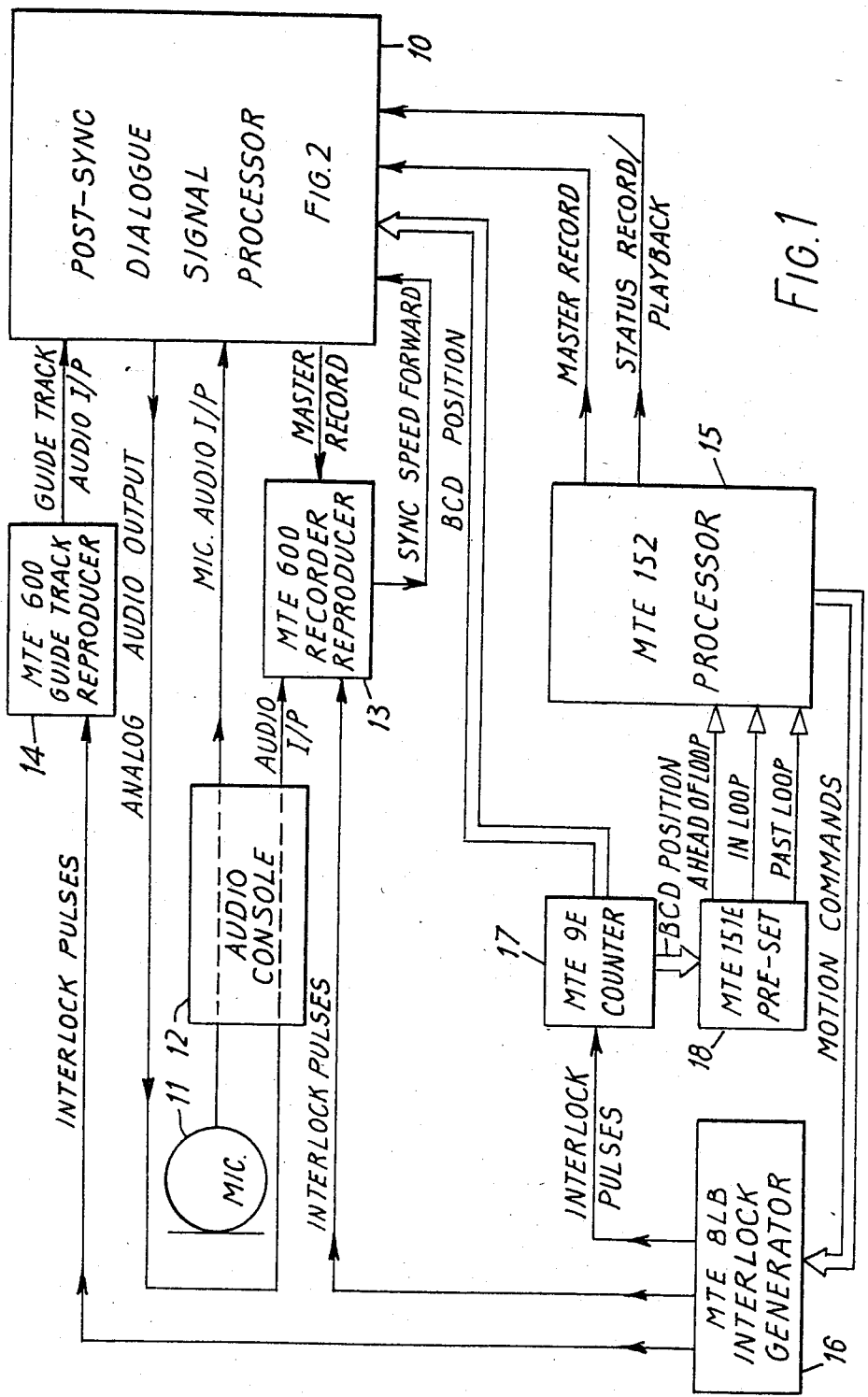

United States Patent [19]
Bloom et al.

[11] Patent Number: 4,591,928
[45] Date of Patent: May 27, 1986

[54] METHOD AND APPARATUS FOR USE IN PROCESSING SIGNALS

[75] Inventors: Phillip J. Bloom; Garth D. Marshall, both of London, England

[73] Assignee: Wordfit Limited, London, England

[21] Appl. No.: 736,407

[22] PCT Filed: Mar. 23, 1983

[86] PCT No.: PCT/GB83/00087
§ 371 Date: Nov. 22, 1983
§ 102(e) Date: Nov. 22, 1983

[87] PCT Pub. No.: WO83/03483
PCT Pub. Date: Oct. 13, 1983

Related U.S. Application Data

[63] Continuation of Ser. No. 586,226, Nov. 22, 1983, abandoned.

[30] Foreign Application Priority Data

Mar. 23, 1982 [GB] United Kingdom ............... 8208376

[51] Int. Cl.⁴ ..................... G11B 5/09; G11B 27/02
[52] U.S. Cl. ............................... 360/13; 360/51
[58] Field of Search .................. 360/13, 15, 14, 51; 381/43

[56] References Cited

U.S. PATENT DOCUMENTS

| | | | |
|---|---|---|---|
| 4,256,924 | 3/1981 | Sakoe | 381/43 |
| 4,271,332 | 6/1981 | Anderson | 179/1.5 |
| 4,384,273 | 5/1983 | Ackland et al. | 381/43 |

FOREIGN PATENT DOCUMENTS

| | | | |
|---|---|---|---|
| 2854601 | 6/1979 | Fed. Rep. of Germany | 360/13 |
| 2849218 | 5/1980 | Fed. Rep. of Germany | 360/13 |

Primary Examiner—Vincent P. Canney
Attorney, Agent, or Firm—Fitch, Even, Tabin & Flannery

[57] ABSTRACT

New dialogue is post-synchronized with guide track dialogue by using signal processing apparatus in which the analog guide track signal $x_1(t)$ undergoes speech parameter measurement processing in a processor (43) to provide a speech parameter vector $A(kT)$. The new dialogue signal $x_2(t')$ is processed to give waveform data which can be stored on disc (25) and a speech parameter vector $B(jT)$ from a parameter extraction processor (42). The variables k and j are data frame numbers, and T is an analysis interval. Some parameters of the vector B are used in process (48) to classify successive passages of the new dialogue signal into speech and silence, to produce classification data $f(jT)$. The vectors A and B and the classification data are utilized in a time warp processor SBC2 to determine a time-warping function $w(kT)$ giving the values of j in terms of the values of k associated with the corresponding speech features, and thereby, indicating the amount of expansion or compression of the waveform data of the new dialogue signal needed to align the time dependent features of the new dialogue signal with the corresponding features of the guide track signal. Editing instructions are generated in signal editor computer SBC1 from the $w(kT)$ data, feature classification data, pitch data $p(jT)$ and the data steam $x_2(nD)$ so that the editing of $x_2(nD)$ can be carried out by the computer SBC1 in which periods of silence or speech are lengthened or shortened to give the alignment. The edited data $x_2(nD)$ is converted to analog by a converter unit (29), and low pass filtered to provide an audio output signal to be recorded as the synchronize new dialogue.

10 Claims, 31 Drawing Figures

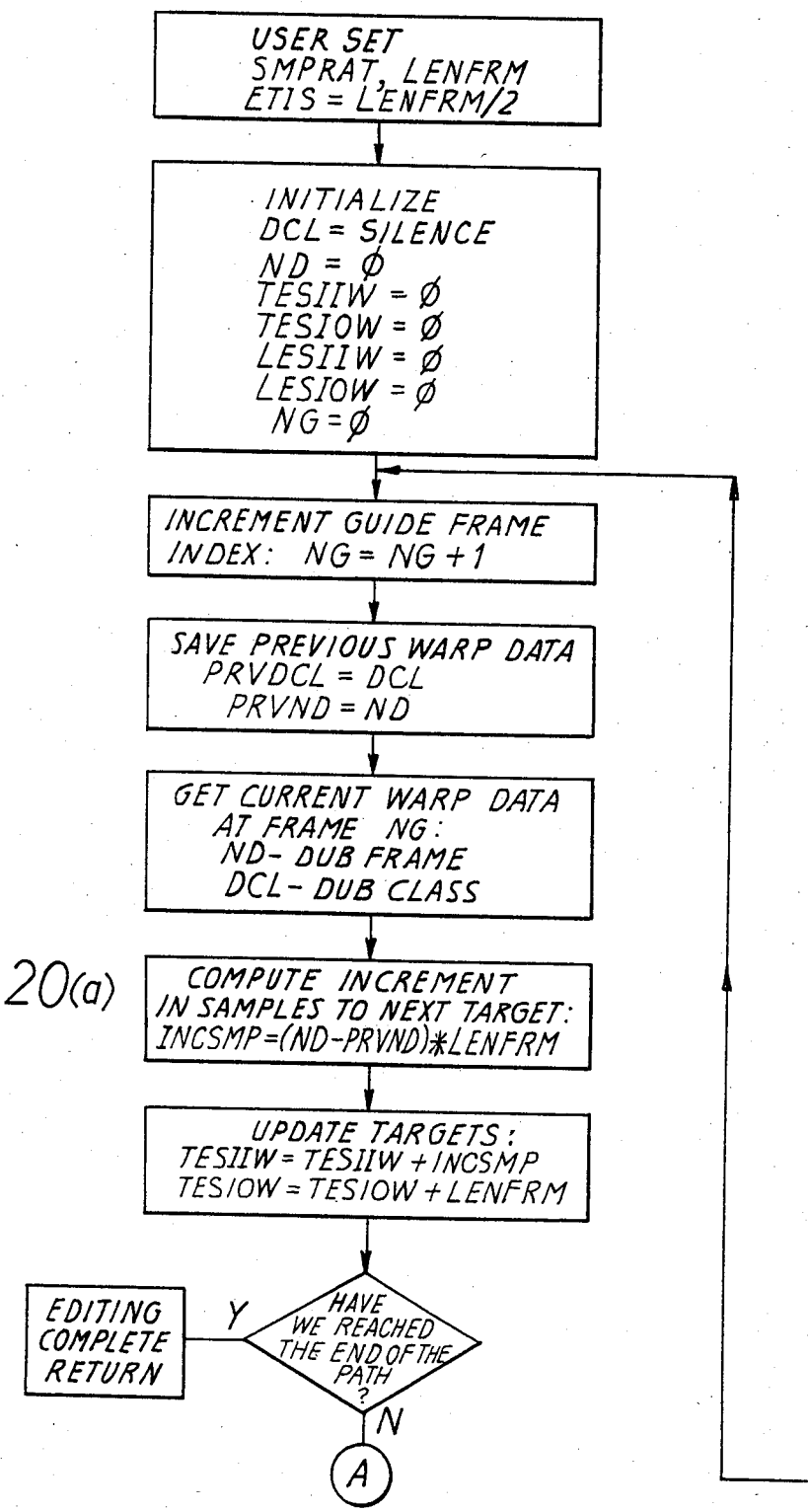

METHOD AND APPARATUS FOR USE IN PROCESSING SIGNALS

This application is a continuation, of application Ser. No. 586,226 filed Nov. 22, 1983, now abandoned.

This invention relates to a method and apparatus for use in processing signals.

During the production of a film soundtrack, it is often necessary or desirable to replace original dialogue, recorded live at the time of shooting the picture, with dialogue recorded afterwards in the studio, since the original dialogue may be unacceptable because of, for example, a level or type of background noise that cannot be eliminated. The studio recording takes place before the final soundtrack is formed from a mix of dialogue, music and sound effects, and is called post-synchronising or post-synching.

The post-synchronising technique most widely used today is known as the virgin loop system and is operated as follows.

The soundtrack editor breaks down the dialogue scenes to be post-synched into sections of one or two sentences each of up to about 30 seconds in duration. Each section, which consists physically of a length of picture-film and an equal length of magnetic film containing the original dialogue recording, is then made into two endless loops. A third loop (also of the same length) is made up from unrecorded magnetic film. This is the "virgin loop". The loop of magnetic film containing the original dialogue is now called the "guide track".

Each of the actors involved in the scene attends individually at a studio especially designed for postsynching. The picture-film loop is loaded onto a film projector, the guide track is loaded onto a magnetic film reprocucer and the virgin loop is loaded onto a magnetic recorder/reproducer. These three machines are adapted to operate in synchronism. The picture-film loop is projected onto a screen in front of the actor. The guide track is replayed to him over headphones, and he endeavours to speak his lines in synchronism with the original dialogue, his efforts being recorded onto the virgin loop. Guide track cues (bleep tones) or chinagraph cue-marks which the editor has drawn beforehand on the picture-film loop are provided. The actor makes repeated attempts at matching the exact timing and performance of the guide track until the director decides that the result is satisfactory. It is possible at any time to switch the machine with the virgin loop from record to playback in order to check the result on a studio loudspeaker.

Once successfully recorded, the loops are removed from the machines and are replaced with the next set of loops covering the next section of dialogue. The entire operation is then repeated for this new section. An average feature film may require several hundred dialogue loops, each one of which may have to be recorded several times with fresh virgin loops, depending on the number of actors in the scene.

The task facing the actor is difficult, since a difference of one to two film frames from synchronism between words and mouth movements is noticeable to the average viewer but is only 0.05 to 0.1 seconds difference. Inevitably, artistic expression becomes subordinated to the need to speak in synchronism. Frequently, after many attempts a compromise is settled for which is nearly right and which tne soundtrack editor knows from experience will enable him to take the magnetic film back to the editing room and with fine cutting, pull the words into synchronism.

The newly recorded loops are eventually assembled into the places in the dialogue track previously occupied by the original dialogue.

The virgin loop system is laborious and time-consuming, and is greatly disliked by actors. Furthermore, it is a generally held view in the film industry that post-synched dialogue is always inferior to original live dialogue from an acting point of view.

With the development of film transport machines capable of high-speed operation in forward and reverse and having logic control, a method known as Automatic Dialogue Replacement (ADR) has come into use in the newer studios.

One example of such a studio is described by Lionel Strutt in an article entitled "Post-Synchronising Sound: Automated Dialogue Replacment using the Computer" at pages 10 196 to 198 in The BKSTS Journal of March 1981, published in England. In ADR it is not necessary to break the film physically into loops. Rolls of picture film, corresponding guide track and virgin magnetic film are loaded onto the respective picture film projector, magnetic film reproducer and magnetic film recorder/reproducer in their entirety, and each loop is formed electronically, in that the machines play through the respective designated dialogue section at normal speed, then fast return back to the beginning of the section and repeat, all locked in synchronism. For example, in the Magnatech 600 Series EL system, interlock pulsesare sent by the 8LB Interlock Generator to each slave machine, i.e. to the picture film projector, the guide track reproducer and the virgin magnetic film recorder/reproducer. These pulses, which are generated at a rate of ten pulses per film frame, and provided in the form of two square waves which are 90° out of phase with one another, the second lagging the first for forward motion and the first lagging the second for reverse motion. Four modes of movement are possible under the command of the MTE 152 Processor: normal speed forward and reverse, and fast forward and reverse. At the normal running speed, the pulse frequency of the interlock pulses transmitted by the interlock generator to the three machines is quartz oscillator controlled. These interlock pulses are also routed to the MTE 9E counter. In a post-synching operation, the rolls of film are laced into the machines at their heads, and a sync mark which the editor has marked beforehand on all the rolls is used to ensure that the three films are adjusted to be in stationary sync. This sync mark is usually designated as 0 feet 0 frames and any point on the rolls can be identified by the number of feet and film frames from the sync mark. Each length of picture film and corresponding guide track which is to be treated as a loop, and which is referred to as a designated loop section, can be specified by two sets of film footage and frame numbers entered into a preset unit (the MTE 151E Pre-set), one set defining the beginning, the other the end of the designated loop section. When the rolls of film are laced at the sync mark the MTE 9E counter is reset to zero (0000,00). The MTE counter is then able to produce a 6-digit binary-coded-decimal signal of footage and frames corresponding to the instantaneous position of the film transport machines relative to the film rolls by counting the interlock pulses from the 8LB interlock generator. This BCD signal is supplied to the MTE 151E Pre-set where it is compared with the two sets of BCD footage and frame numbers entered by the operator as start and finish frame identification for the designated loop section. The result of this comparison is supplied to the MTE 152 Processor as either an AHEAD OF LOOP signal, an IN LOOP signal, or a PAST LOOP signal. In use, the MTE 152 Processor cycles the machines through a selected designated loop section by starting from a point 5 to 10 feet in front of the loop entry frame, i.e. the first frame in the designated loop section, then running at normal speed through to the end of the designated loop section, and then rewinding at fast reverse speed and repeating the cycle. At transition from ahead of loop to in loop, the 151E preset for loop entry frame matches the MTE 9E counter BCD signal and the MTE 152 Processor produces a MASTER RECORD On signal which activates the recording function of the recorder/reproducer. Similarly, this signal is switched off at transition from in loop to past loop. The analog audio signals from the magnetic film reproducer and the actor's microphone are routed, via a mixing console for example, to the actor's headphones and the magnetic film recorder/reproducer respectively.

In relation to the virgin loop system, ADR has the advantages that the duration of each designated loop section can be specified and altered during a post-synching session to suit an actor, and that more than the most recently produced recorded loop can be replayed for assesment by actor and director.

However, the sound editor still has to edit the post-synch dialogue to "pull" it into acceptable synchronism. Furthermore, the several actors in a scene cannot record onto separate multi-tracks on the virgin stock, since cutting one would interfere with the others alongside it. Thus a separate roll of virgin magnetic film is required for every actor in a scene.

Similarly, where videotape is used instead of film, post-synching of dialogue must sometimes be carried out, and, hitherto, the methods used have been analagous to those for film ADR.

The aspect of conventional post-synching which is the principal cause of difficulty and constraint is the necessity for the actor to begin speaking at a predetermined instant to within a fraction of a second, and to maintain synchronism to the end of a spoken passage. There is a need for a method and equipment which makes post-synching less onerous. The present invention arises out of attempting to provide such a method and equipment but is not limited to the processing of speech signals for the purposes of post-synching. The present invention may be applied in other circumstances in which a second signal substantially resembling a first signal is edited as regards the relative timing of particular features of the second signal so as to align these particular features with the corresponding features in the first signal whereby an output is produced which substantially replicates the first signal at least as regards the timing of the particular features chosen. The present invention may be regarded as providing a method and signal processing apparatus for finding chosen features in two similar signals and automatically editing one of these signals to as to subtantially eliminate any relative timing discrepancies between corresponding chosen features of the two signals without the editing affecting essential signal characteristics.

According to one aspect of the present invention, there is provided a method of processing signals, the method having the steps of producing data related to selected time dependent features of a first signal and data related to the same time-dependent features of a second signal which substantially resembles the first signal; utilizing the said further data so as to produce data representative of difference between the timing of features of the second signal and the timing of corresponding features of the first signal; producing data representative of the waveform of the second signal in a medium suitable for signal editing; utilizing the timing difference data to generate editing data suitable for editing the data representative of the second signal so as to produce output data representative of an edited form of the second signal which substantially replicates the relative timing of the said features of the first signal, and editing the data representative of the second signal in accordance with the editing data.

According to another aspect of the present invention, there is provided signal processing apparatus comprising: means for determining from first and second signals data related to selected time-dependent features of the said signals; means for utilizing the said data so as to produce data representative of difference between the timing of the said features of the second signal and the timing of substantially the same features in the first signal; means for producing and storing data representative of the second signal waveform; means for utilizing the timing difference data so as to generate editing data suitable for editing the data representative of the second signal to produce output data representative of an edited form of the second signal which substantially replicates the relative timing of the said features of the first speech signal; and means for effecting such editing.

According to a further aspect of the present invention there is provided a method for use in producing recorded speech, the method having the following steps: producing digital data representative of a second speech signal; which is substantially imitative of a first speech signal; processing the said first and second speech signals at regular intervals to determine therefrom the occurrence and/or value of selected speech parameters of the first and second signals; generating digital data indicating the presence or absence of speech in the second signal in repsonse to processed digital data representative of the occurrence and/or value of selected speech parameters in the second signal; generating digital data representative of pitch in the second signal; utilizing the sequences of digital data indicating the presence or absence of speech and representative of speech parameters of the first and second speech signals to generate digital data representative of difference between the timing of the said characteristic features of the second speech signal and the timing of the corresponding characteristic features of the first speech signal; processing the digital data representative of pitch and the said difference in timing and the sequence of digital data indicating the presence or absence of speech in the second speech signal so as to generate editing data in accordance with a requirement to substantially replicate with the said characteristic features of the second speech signal the timing of the corresponding characteristic features of the first speech signal by adjusting the durations of silence and/or speech in the second speech signal; and editing the digital data corresponding to the second speech signal in accordance with the editing data and generating thereby edited digital data corresponding to an edited version of the second speech signal.

According to another aspect of the invention there is provided a digital audio system including means for storing digital data corresponding to a second speech signal which is substantially imitative of a first speech signal; means for reading the said digital data from the said storing means; means for determining from the first and second signals at regular intervals the occurrence and/or value of selected speech parameters of the first and second signals; means for generating digital data encoding characteristic acoustic classifications such as silence, unvocalised sound and vocalised sound in response to processed digital data representative of the occurrence and/or value of selected speech parameters; means for generating digital data representative of pitch in the second signal; means for utilizing the sequences of digital data encoding the said characteristic classifications and representative of speech parameters of the first and second speech signals to generate digital data representative of difference between the timing of the characteristic features of the second speech signal and the timing of the corresponding characteristic features of the first speech signal; means for processing the digital data representative of pitch and the said difference in timing and the sequence of digital data encoding characteristic classifications so as to generate editing data in accordance with a requirement to substantially replicate with the features of the second speech signal the timing of the corresponding characteristic features of the first speech signal by adjusting the durations of silence and/or speech in the second speech signal; and means for editing the digital data corresponding to the second speech signal in accordance with the editing data and generating thereby edited digital data corresponding to an edited version of the second speech signal.

According to yet another aspect of the invention there is provided recorded speech produced by a method or with an apparatus or system as defined in any of the preceding four paragraphs. The recorded speech may be in the form of a dialogue track for a film or videotape.

In general, it frequently occurs that a signal of interest, which can be represented as a function of time t by $s_1(t)$, can only be recorded under less than ideal conditions. Typically, in being recorded, such signals pass through a linear, time invariant system, of impulse response $h(t)$, and are corrupted by additive noise which is also a function of time, $q(t)$. Only the resulting signal $x_1(t)$ can be captured at a receiver. In other instances where since there is no degradation $x_1(t)=s_1(t)$, the signal may still not be satisfactory for other reasons. Nevertheless, time-dependent features of $s_1(t)$ which are significant for some purpose have occurred at specific moments in time and it is the relative timing of the occurrence of these features that often must be preserved. Such an unsatisfactory signal $x_1(t)$ with significant time-dependent features will now be referred to as a reference signal. In applying the present invention to these circumstances, a first step is the provision of a second signal $x_2(t')$, which will now be referred to as the replacement signal and where t' indicates that $x_2(t')$ is a function of time on a scale independent of t, that contains essentially the same sequence of time-dependent features as $s_1(t)$ but whose features occur with only roughly the same timing as the corresponding features of $s_1(t)$.

Normally it is not necessary that t and t' begin from the same absolute moment in time because either or both $x_1(t)$ or $x_2(t')$ may be stored for later access and retrieval. It should be noted that t and t' can refer to the time scale of either the actual or stored reference or replacement signals, respectively. The times $t=0$ and $t'=0$ refer to the beginnings of signals $x_1(t)$ and $x_2(t')$, respectively, whether these are the actual signals or their stored versions. Furthermore, the first significant event to occur in $x_1(t)$ is the beginning of the signal $s_1(t)$ at some value $t>0$ and, similarly, a corresponding signal of interest $s_2(t')$ in $x_2(t')$ begins in $x_2(t')$ at some value of $t'>0$. Selected physical aspects of the signals $x_1(t)$ and $x_2(t')$ are periodically measured and from these measurements values of useful signal parameters, including time-dependent parameters, are determined. The measurements are carried out at a sufficiently high rate for significant changes in the characteristics of the signals $x_1(t)$ and $x_2(t')$ to be detected. The replacement signal is also classified from the sequence of some or all of the parameters, the classification referring to whether the signal of interest $s_2(t')$ is present or not in $x_2(t')$ over the measurement period. The time-dependent parameters of each measured signal and the time-dependent classifications of the replacement signal are then processed using pattern matching techniques to produce a time-dependent function, which may be referred to as a time-warping path, that describes the distortion of the time scale of the replacement signal $x_2(t')$ that must take place to give the best replication of the timing of the time-dependent features of the reference signal. The time scale distortion function is analysed to detect the presence of sufficient discrepancies between the reference and replacement signals' time scales to warrant alterations being made to the signal waveform of the replacement signal to achieve the desired alignment of significant features occurring on the time scale of the replacement signal with the corresponding significant features on the time scale of the reference signal. The information obtained from this analysis of the time-scale distortion is utilized with information on the time-dependent classifications of, and possibly pitch and waveform data of, the replacement signal to generate detailed control information for an editing process which is to operate on the replacement signal. This control information is then used in the editing process in which the control information actuates the deletion and/or insertion of appropriate sequences of signal data from or into the replacement signal so as to substantially replicate the timing of the significant relative time-dependent features of the reference signal in the edited signal.

In accordance with a preferred embodiment of the present invention a computer system with a large disc storage is arranged to record and automatically post-synchronise new dialogue with an original guide track. The system adjusts the timing of the new words primarily by altering the duration of the silent gaps between words and, in acceptable situations, by adjusting the duration of the speech elements. The decisions controlling this 'microediting" of the speech are based on a knowledge of the production and perception of speech and will therefore ensure that the edited speech sounds natural. The processing does not necessarily take place in real time. It takes place during recording of the new dialogue, and if necessary, during wind-back and playback phases of the operation and thus causes no delays. This preferred computing system has an analog to digital and digital to analog conversion system coupled via a large buffer memory and input/output interface to a high speed (i.e. 1.2 M. bytes/sec) data transfer bus. A dual channel parameter extraction process system coupled via an I/0 interface to the bus, a large cpacity (i.e. 84 M. byte) magnetic disc memory coupled via a disc controller to the bus, suitable hardware for receiving film frame position and control signals produced by a Magnatech EL system and transmitting control signals to the Magnatech EL system coupled to a parallel input/output port of a single board computer with on-board random access memory which is in turn coupled to the bus, a logic control and data entry keyboard and VDU coupled to a serial input/output port of the single board computer, and a second single board computer coupled to the bus and via a serial or parallel port to the other single board computer.

Figure 2:
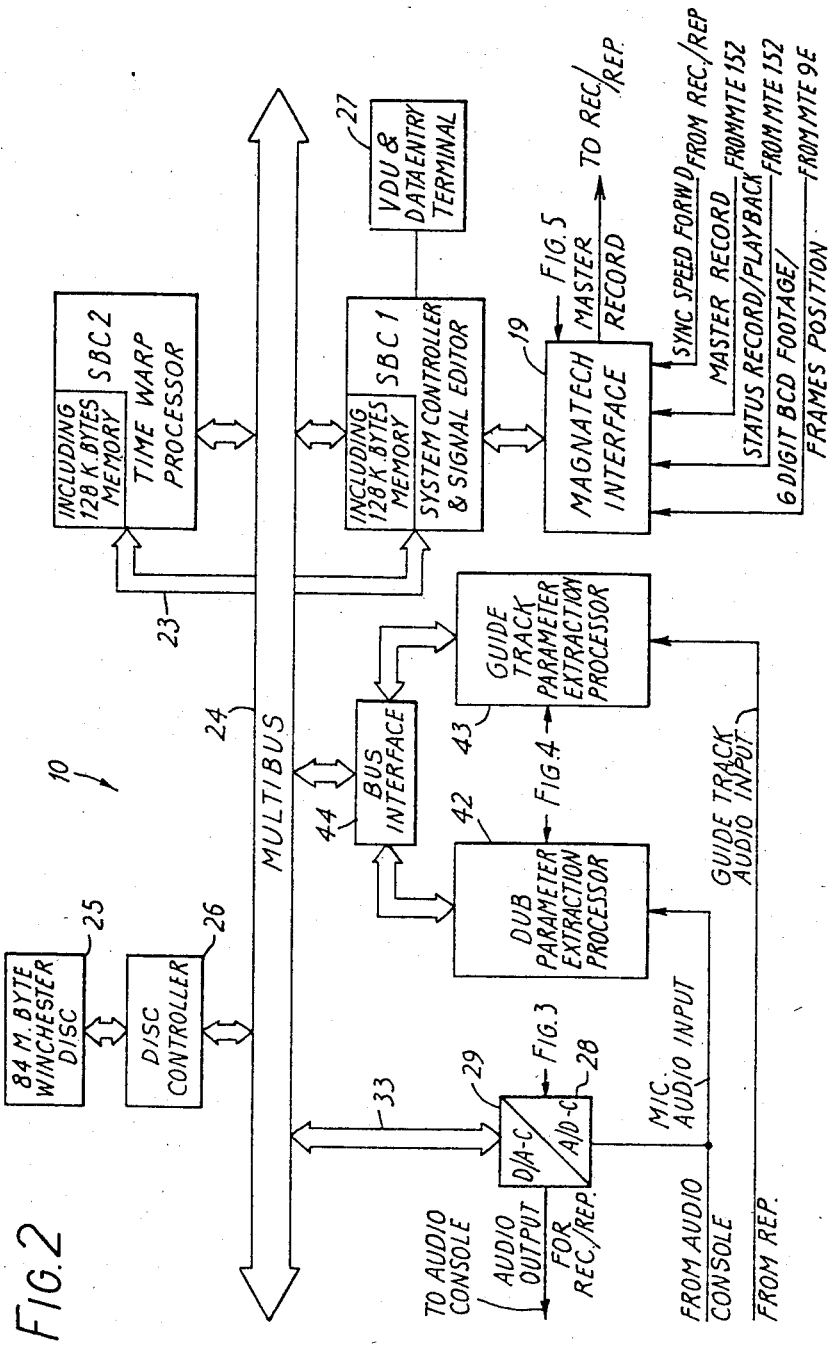
Figure 3:
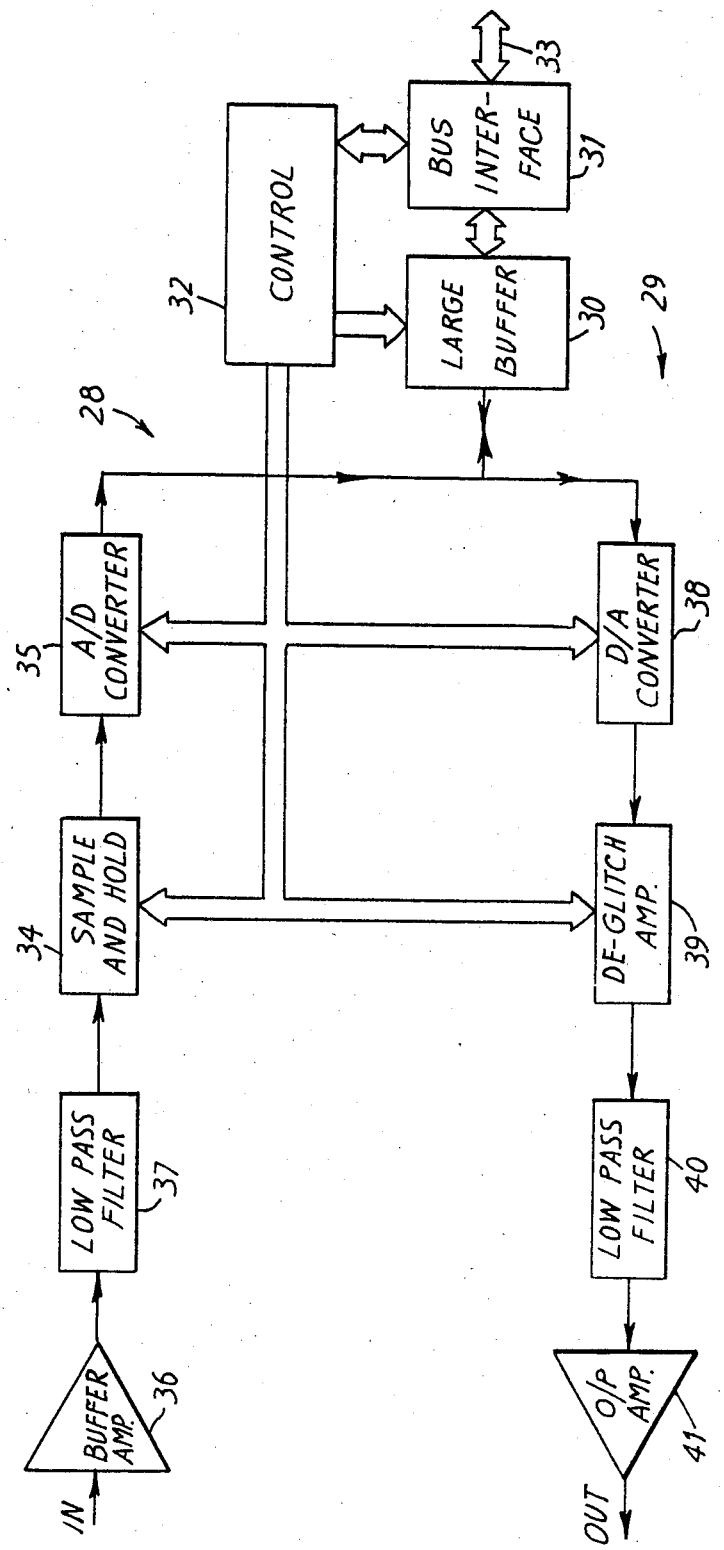
Figure 4:
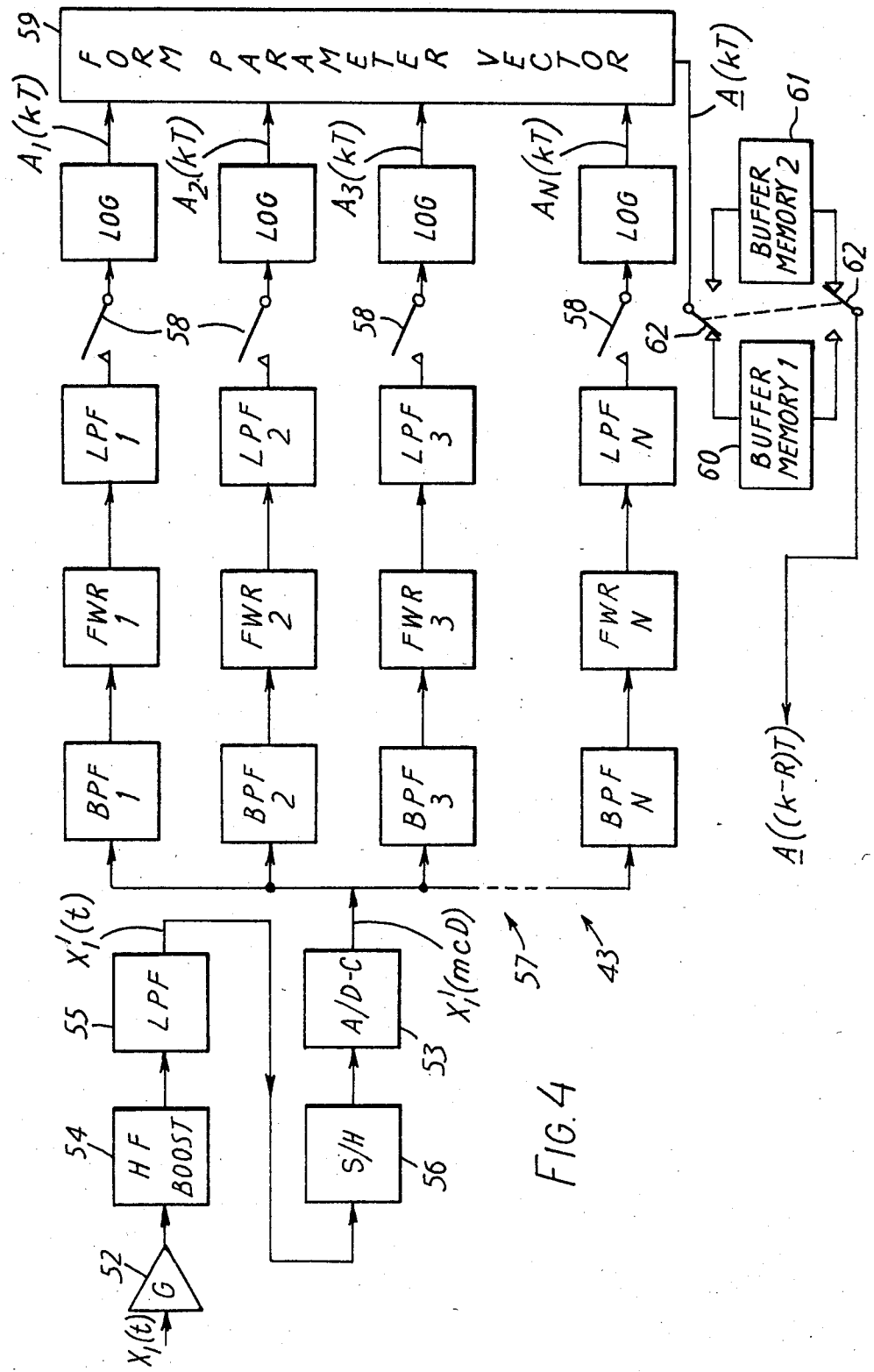
Figure 5:
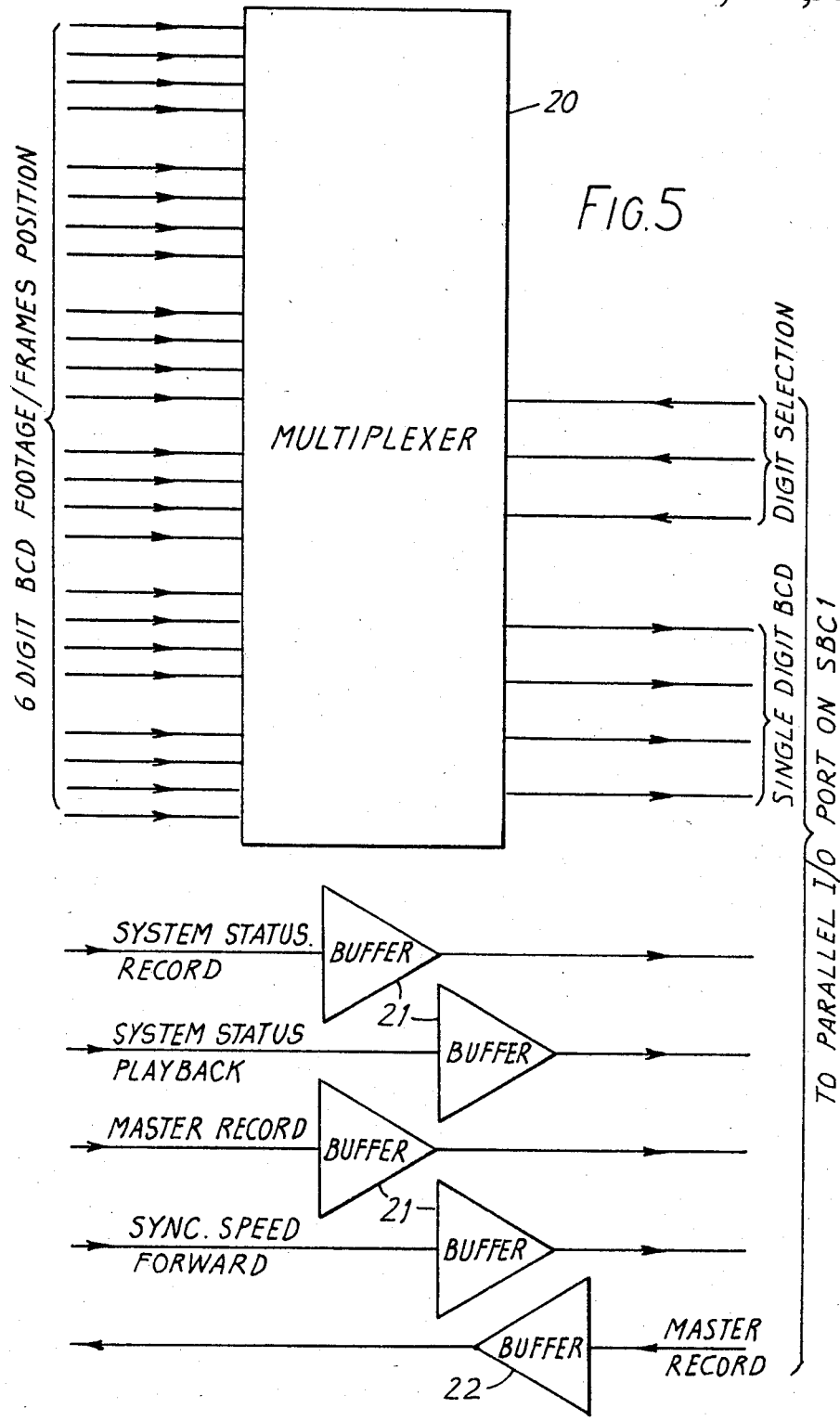
Figure 6:
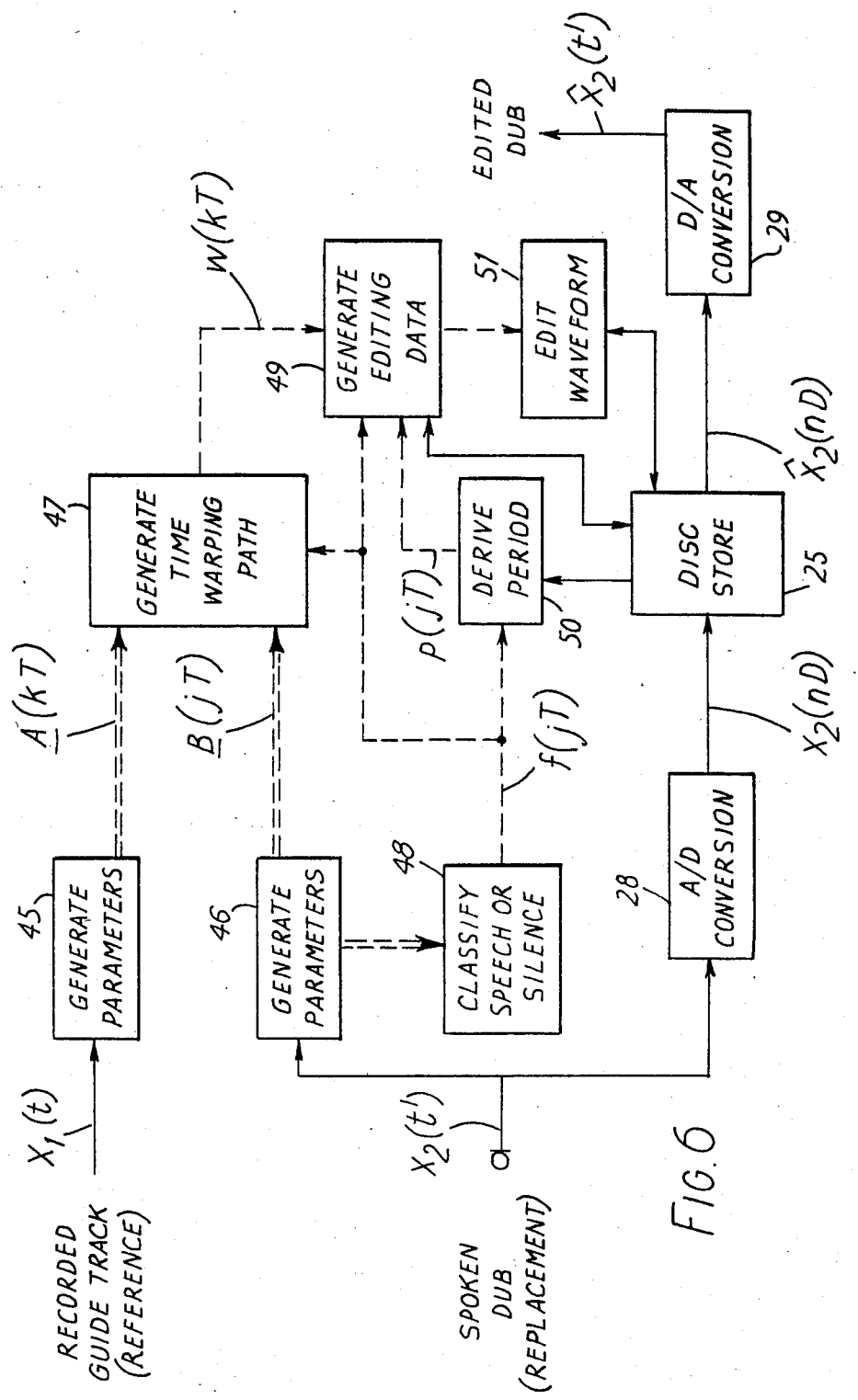
Figure 7:
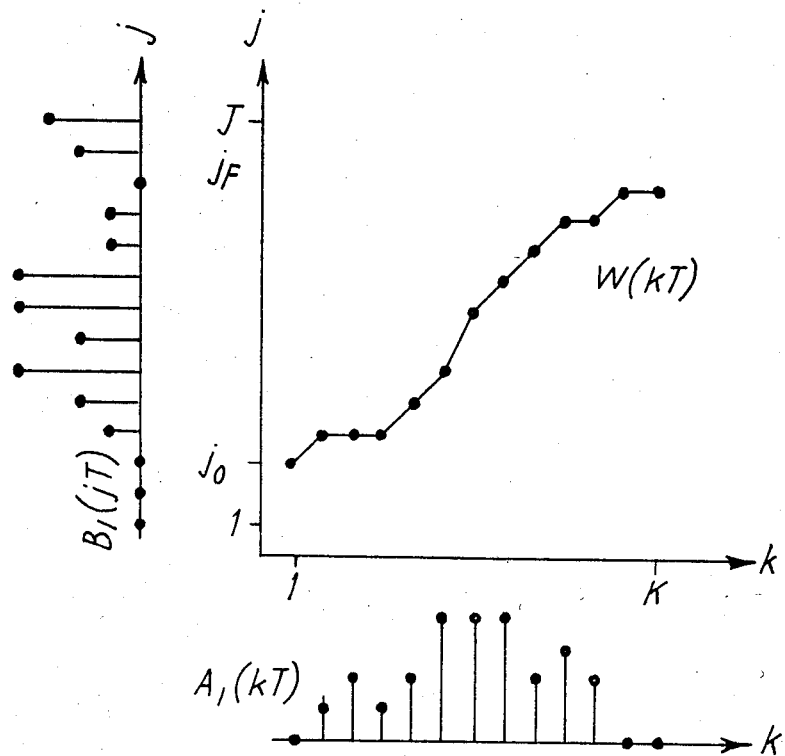
Figure 8:
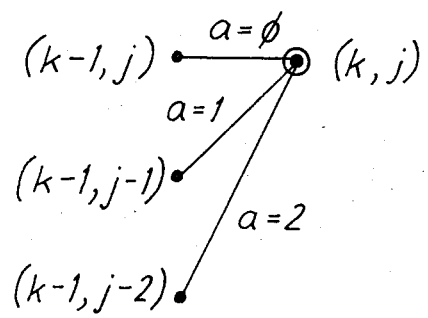
Figure 9:
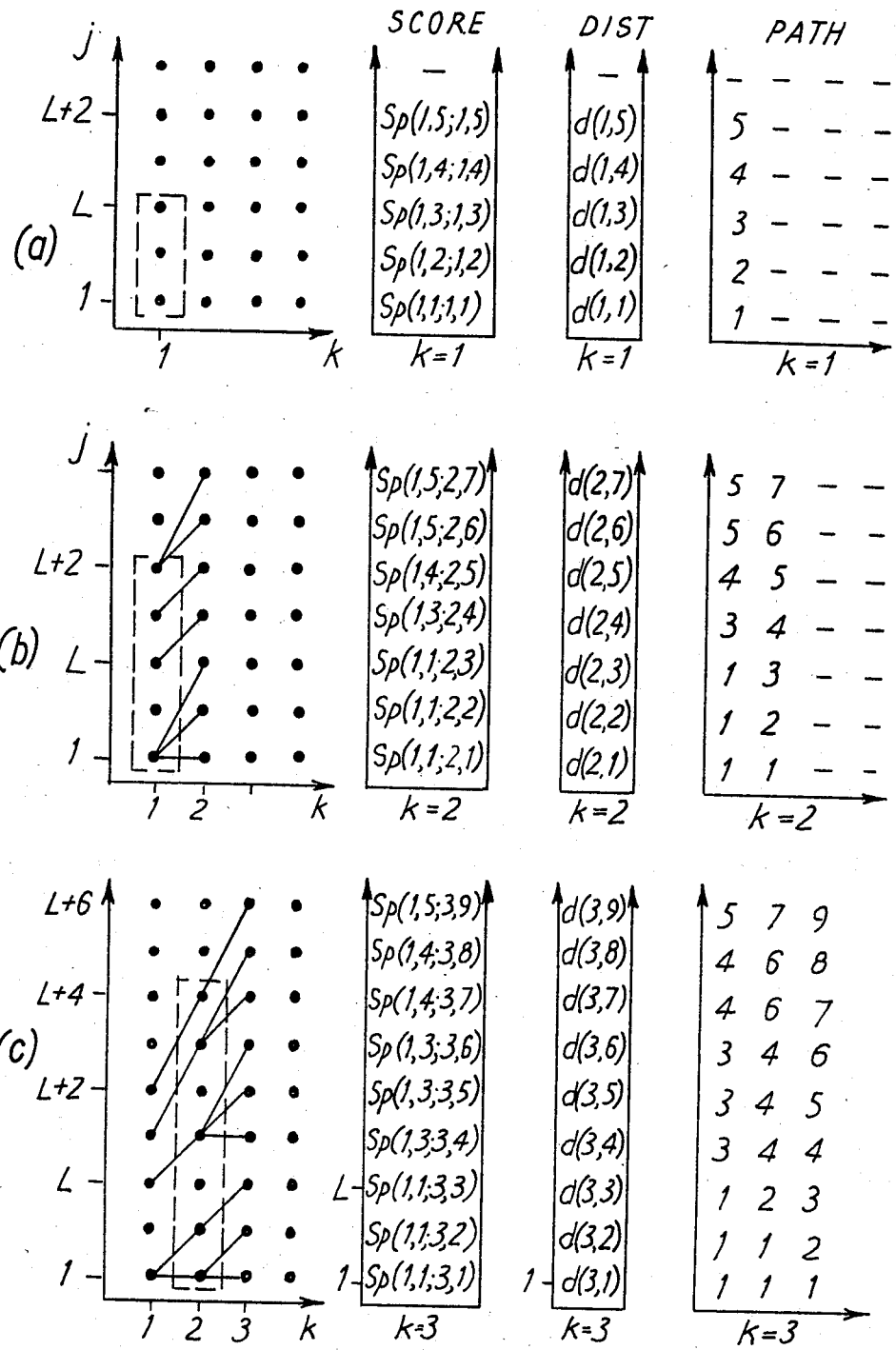
Figure 10:
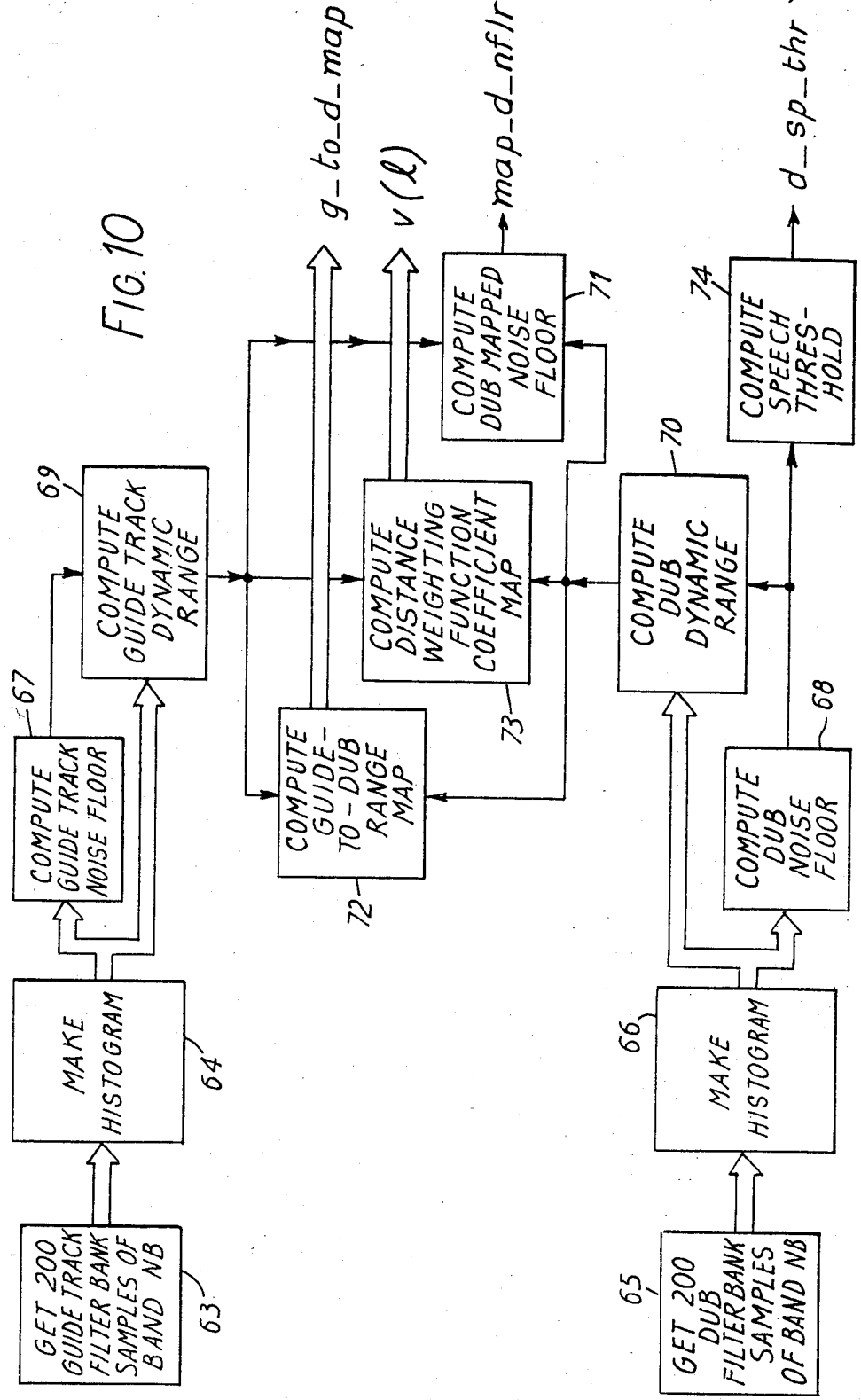
Figure 11:
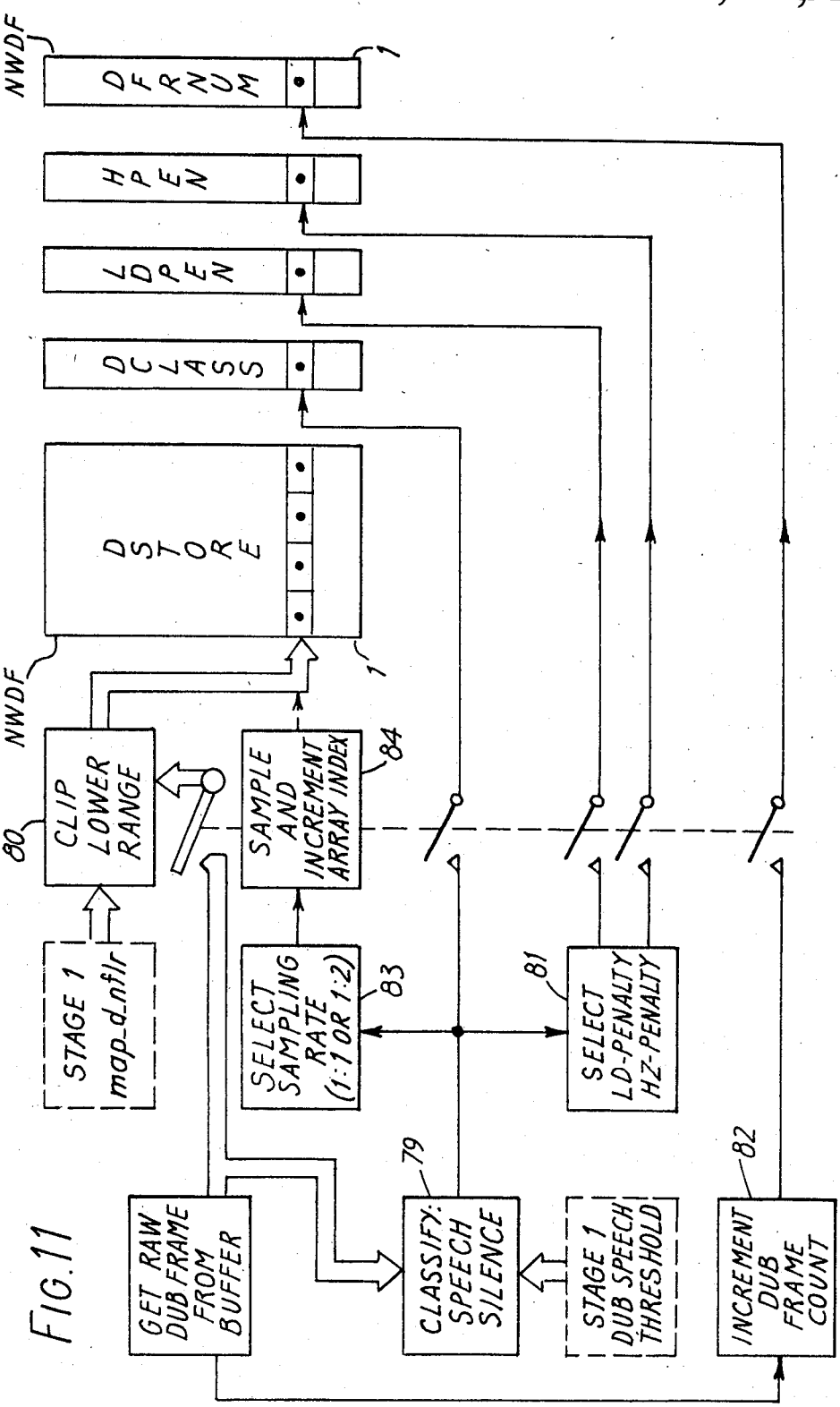
Figure 12:
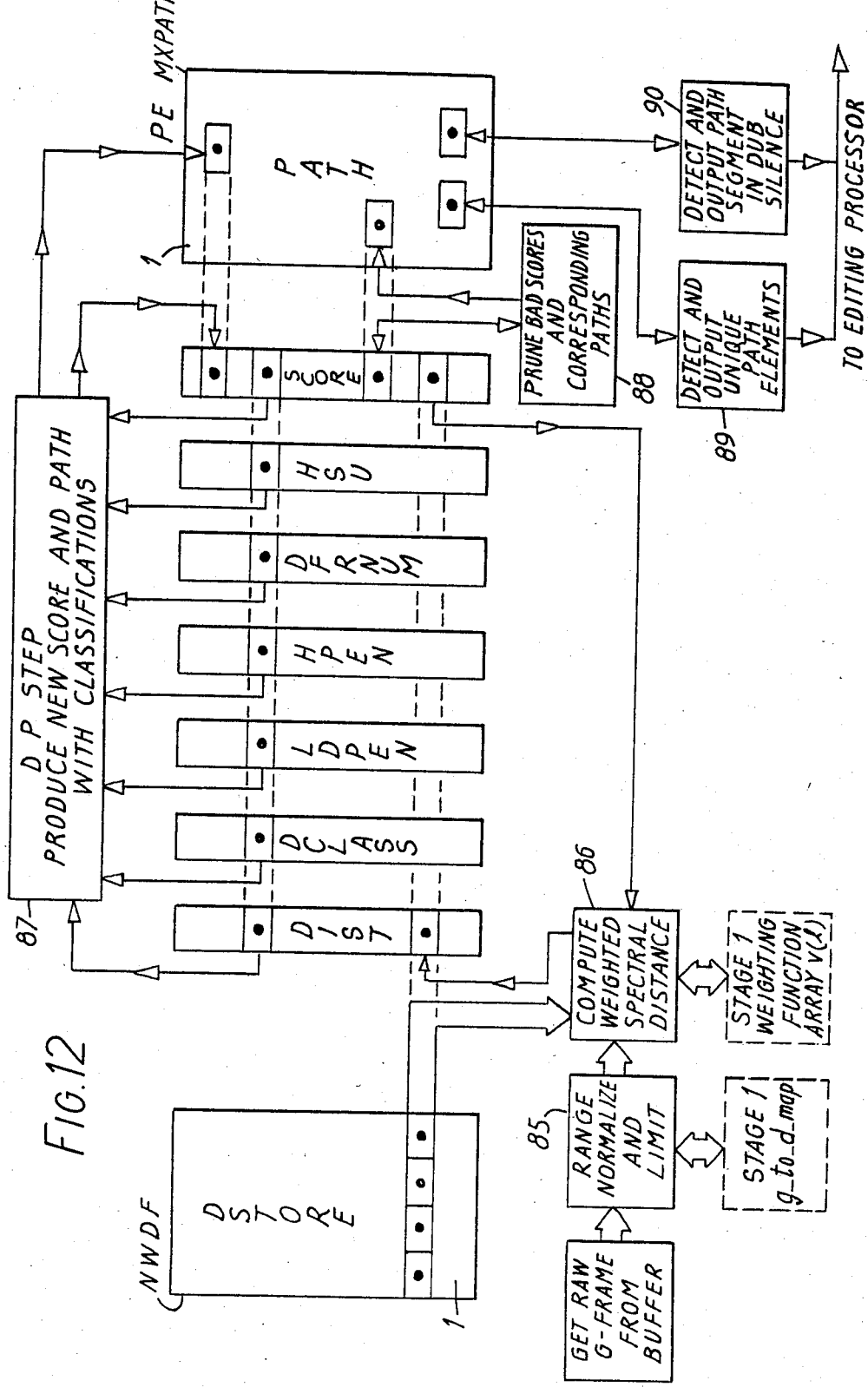
Figure 13:
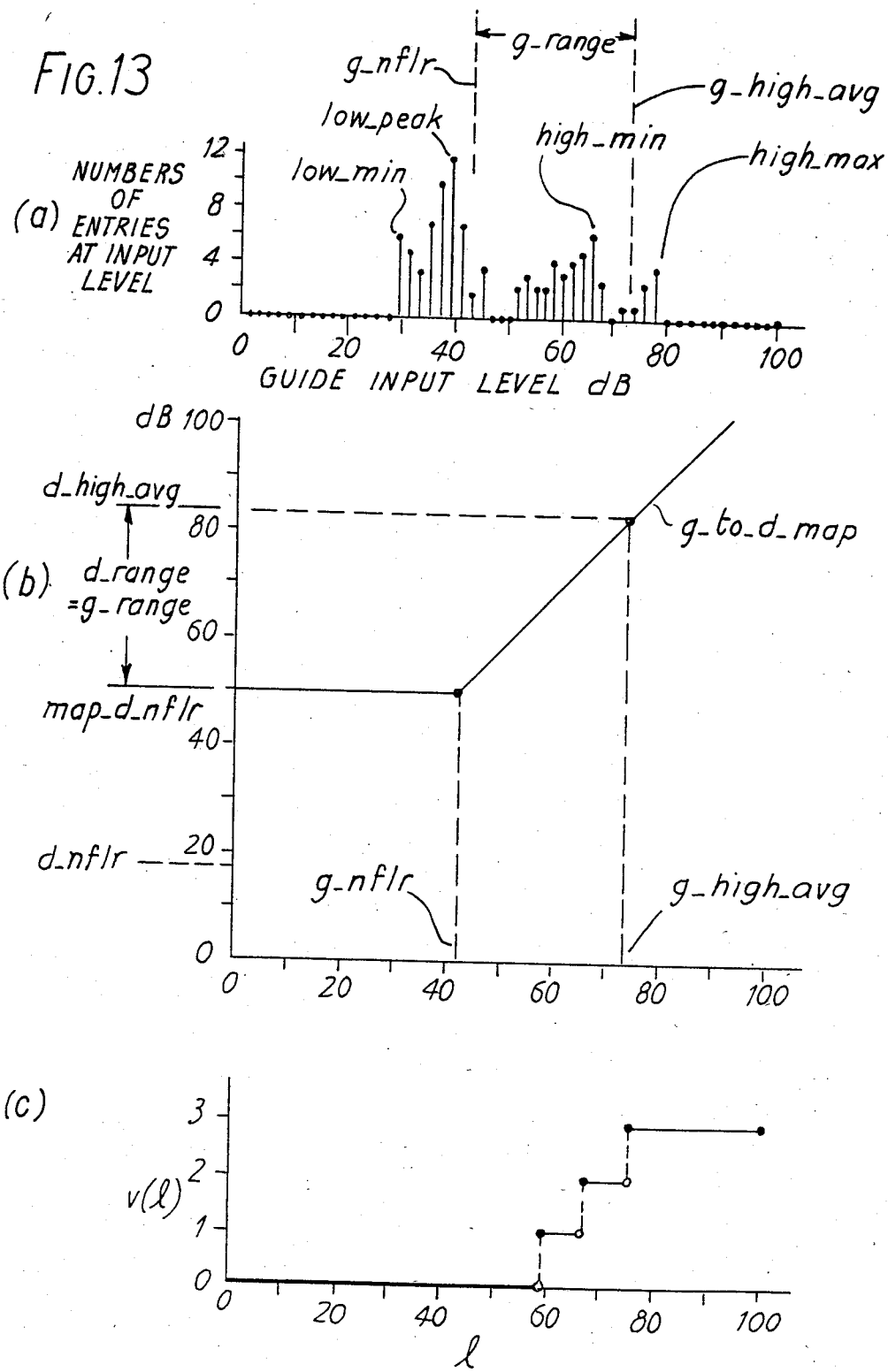
Figure 14:
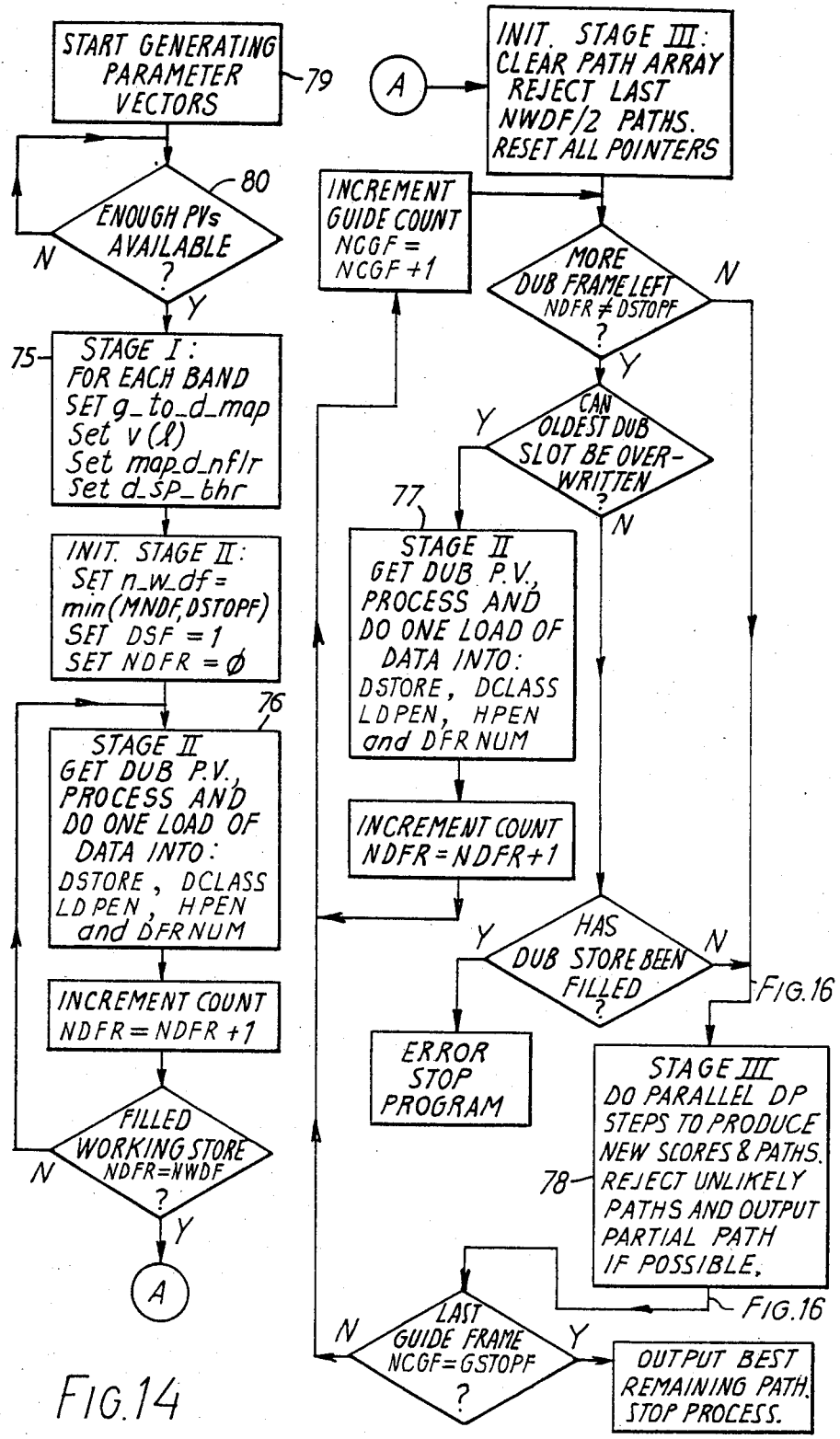
Figure 15:
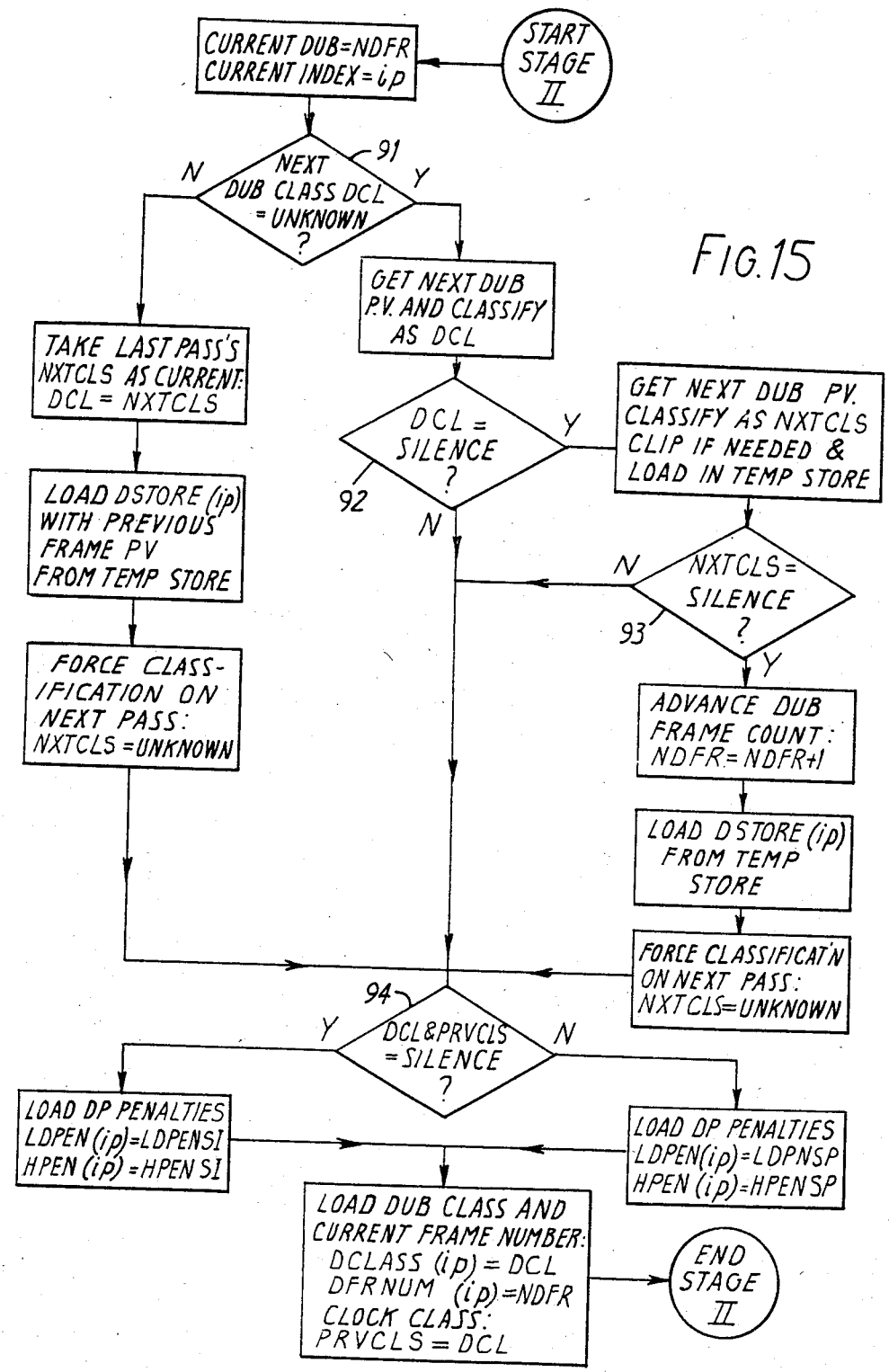
Figure 16:
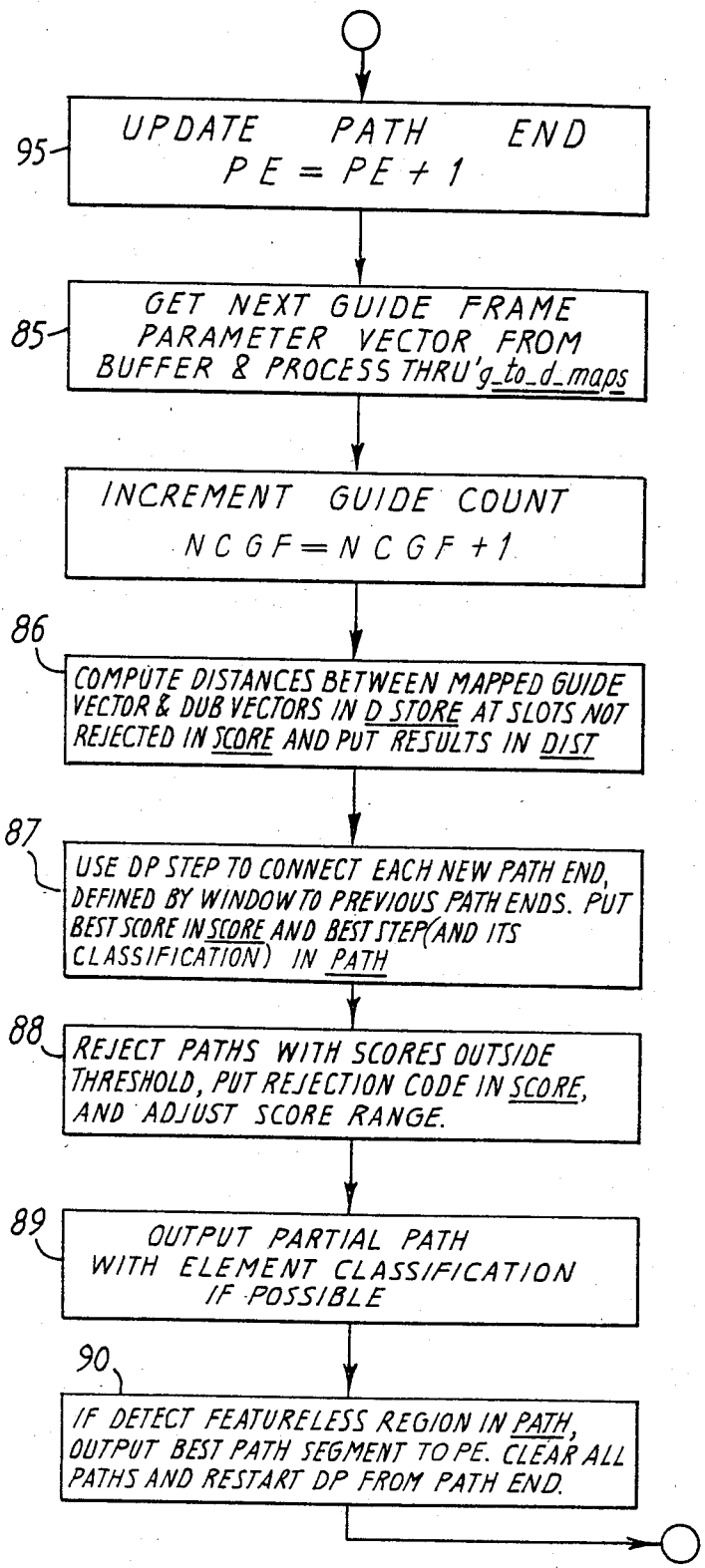
Figure 17:
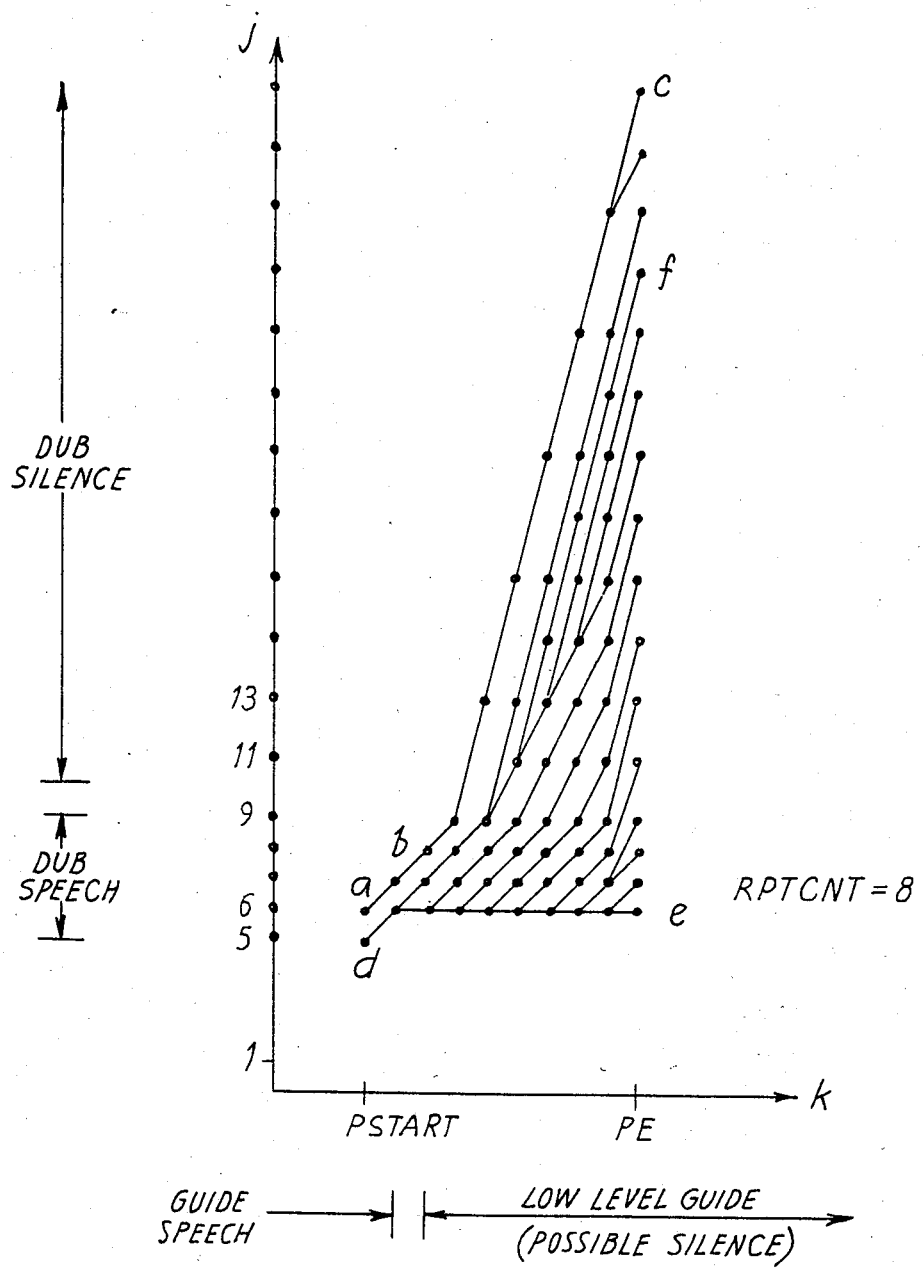
Figure 18:
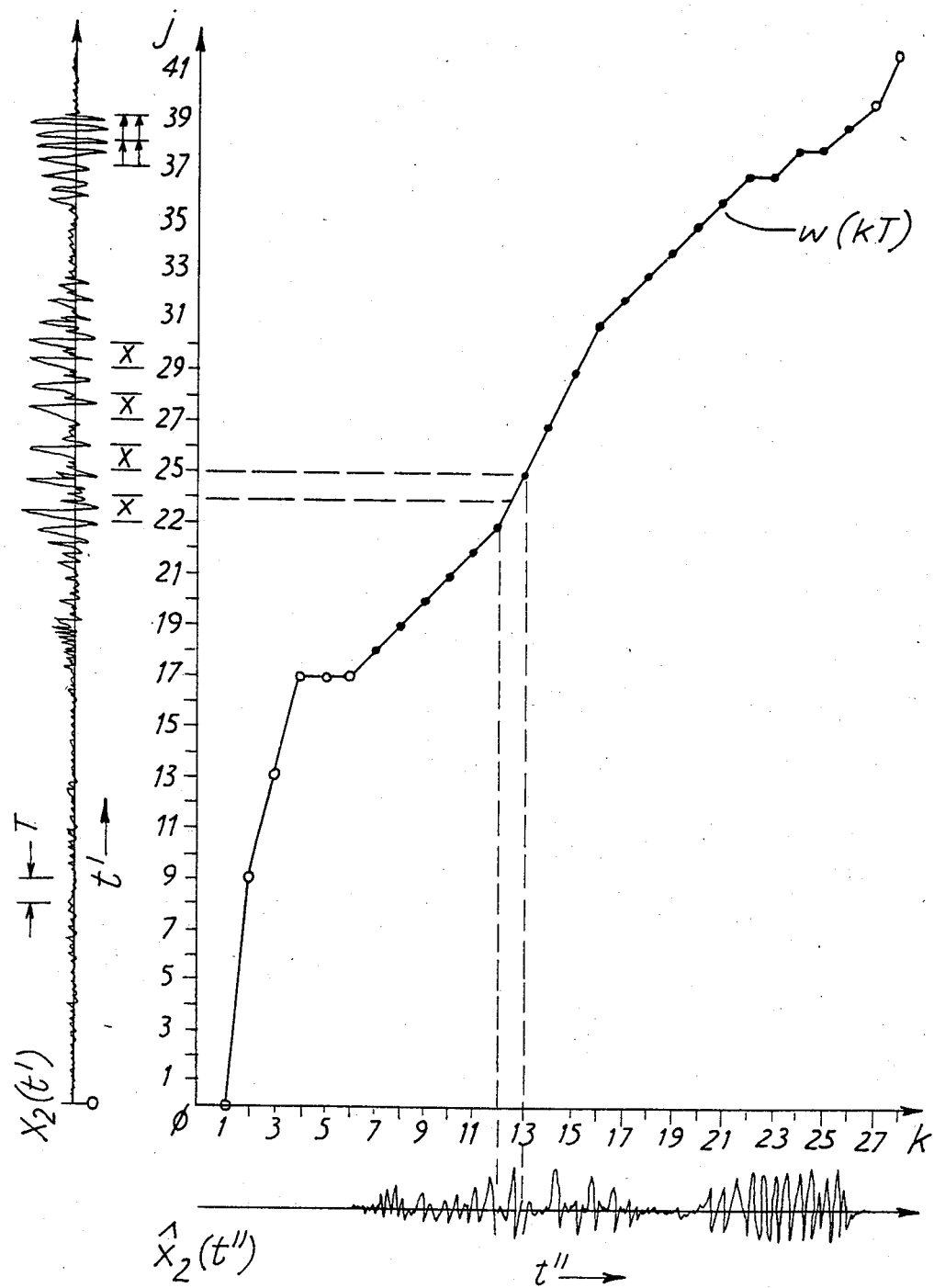
Figure 19:
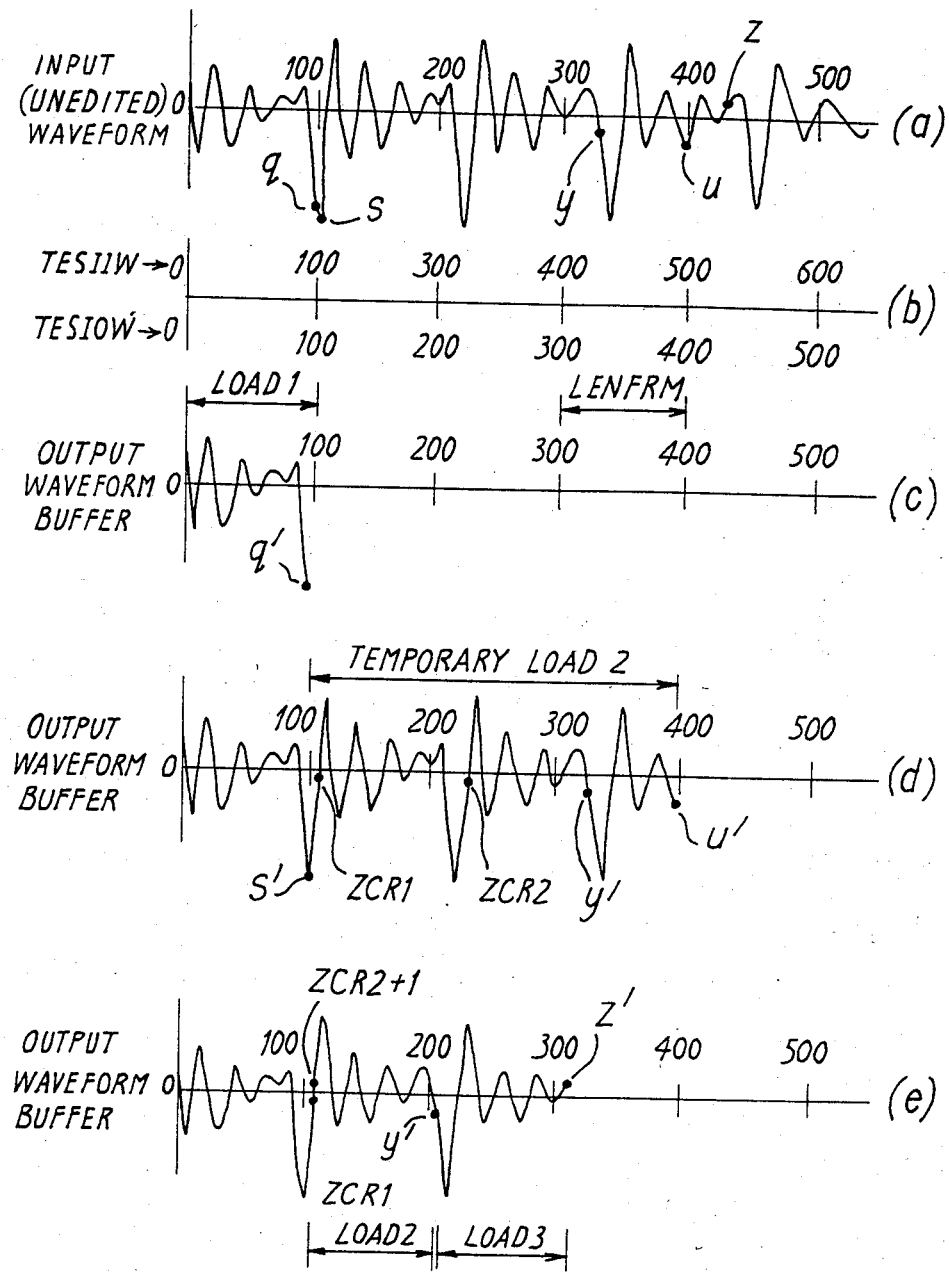
Figure 20B:
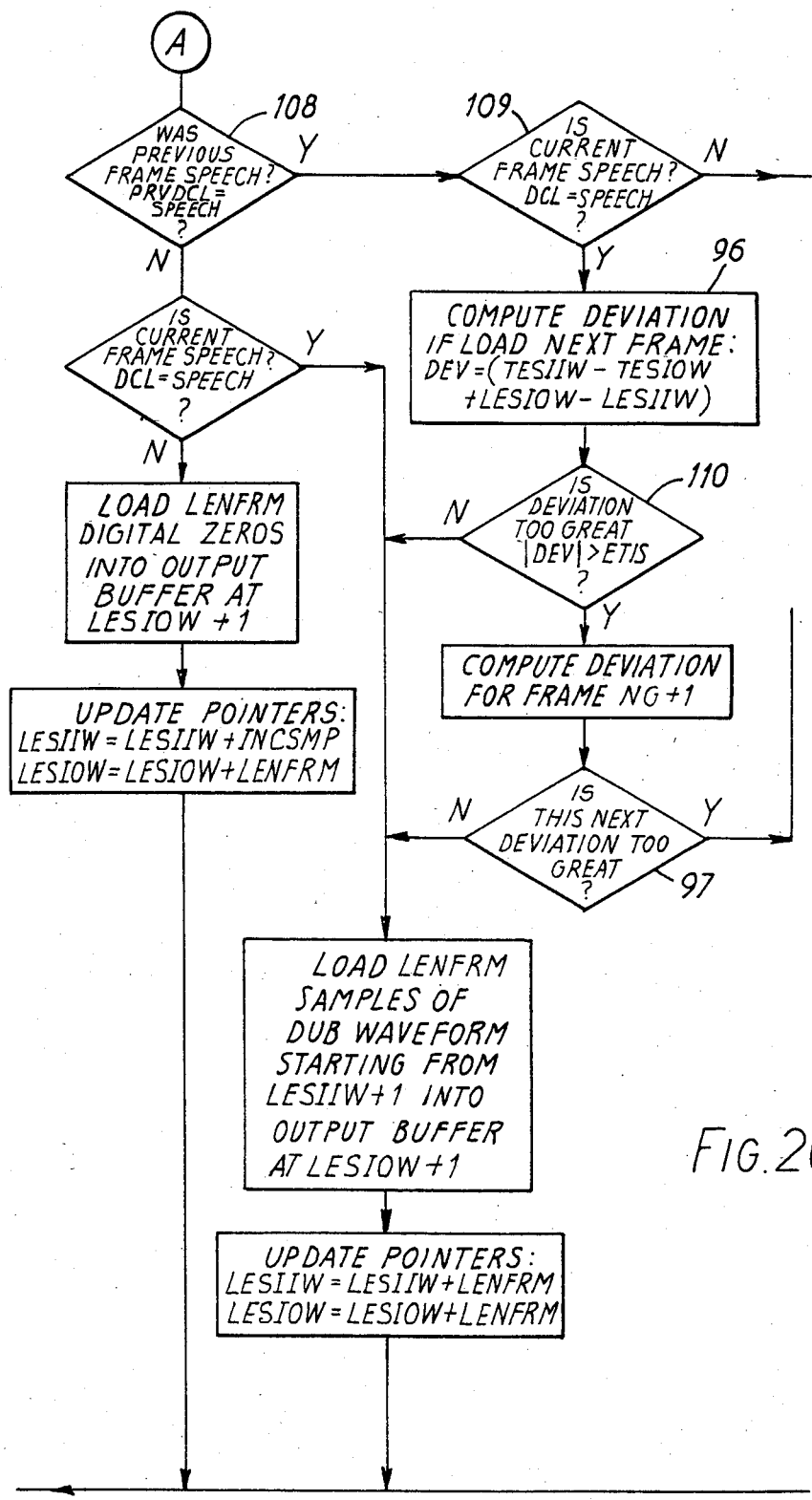
Figure 20C:
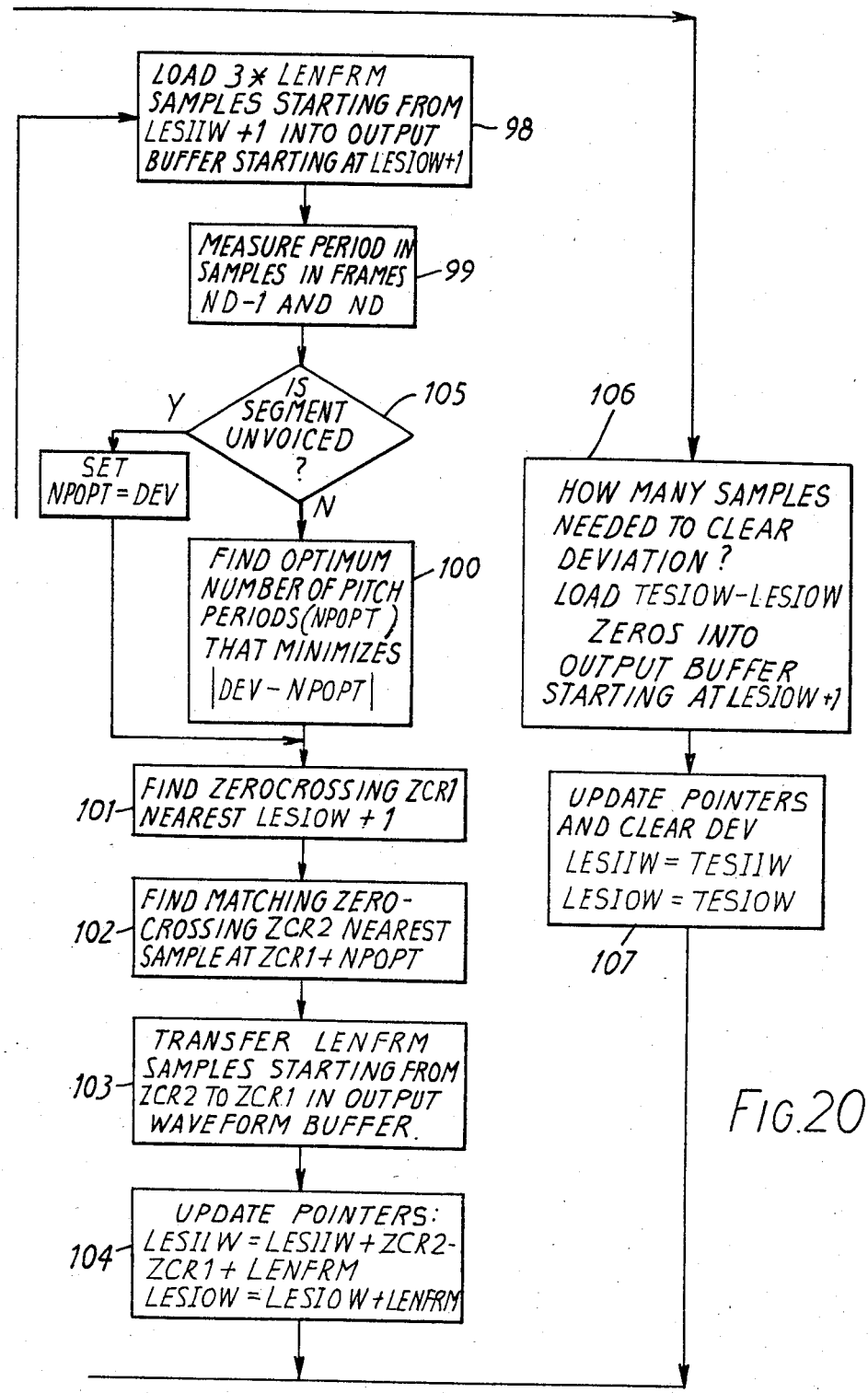
Figure 21:
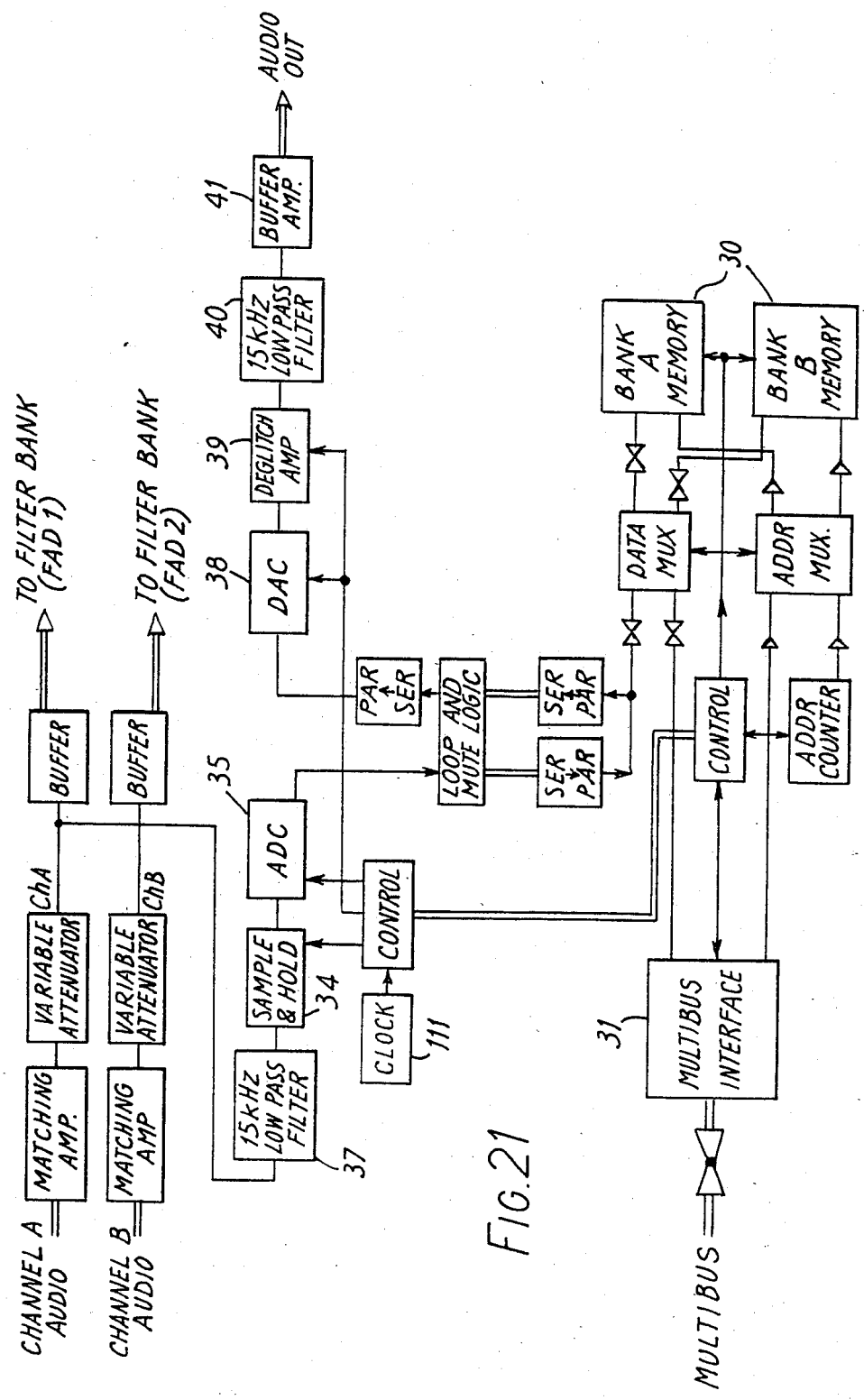

This invention will now be described by way of example with reference to the accompanying drawings, in which:

FIG. 1 is a block diagram of a post-synchronising system embodying the invention, FIG. 2 is a more detailed block diagram of a processor in the system of FIG. 1, the processor embodying the invention, FIG. 3 is a block diagram of part of the processor of FIG. 2, FIG. 4 is a block diagram representing schematically processes carried out by part of the processor of FIG. 2, FIG. 5 is a schematic diagram of an interface in the processor of FIG. 2, FIG. 6 is a block diagrammatic representation of the processing effected by the processor of FIG. 2, FIGS. 7, 8 and FIG. 9, consisting of (a)–(c), are graphical illustrations for explaining some processes effected in the proccessor of FIG. 2, FIG. 10 is a flow diagram of part of the processing effected in the processor of FIG. 2, FIGS. 11 and 12 are graphical illustrations of data organization and processing effected in the process of FIG. 2, FIG. 13 is a group of three graphical illustrations, (a)–(c), for explaining processes in the processor of FIG. 2, FIGS. 14, 15 and 16 are flow charts illustrating three stages of processing effected in the processor of FIG. 2, FIG. 17 is a graphical illustration of a selection procedure included in the processing illustrated by FIG. 16, FIG. 18 is a graphical illustration of a computed time warping path and its relationship to an input analog signal and a resulting output analog signal, FIG. 19 is a set of five graphical illustrations (a)–(e) for explaining the processing by the processor of FIG. 2 in relation to analog signals, FIG. 20(a), 20(b) and 20(c) form a flow chart illustrating processing in the editing effected in the processor of FIG. 2, and FIG. 21 is a detailed block circuit diagram of part of the processor of FIG. 2.

FIG. 1 illustrates schematically an embodiment 10 of the invention cooperating with automated dialogue replacement studio equipment to provide edited replacement dialogue which is in synchronism with picture film. The automated dialogue replacement equipment consists of an actor's microphone 11, an audio console 12 and Magna-Tech Electronic units MTE 600 recorder/reproducer 13, MTE 600 guide track reproducer 14, MTE 152 processor 15, MTE 8LB interlock generator 16, MTE 9E counter 17, and MTE 151E pre-set unit 18, with interconnecting signal channels. A Magna-Tech PR 635 High Speed Projector (not shown) is also included for projecting picture film.

In use, as in the automatic dialogue replacement method (ADR), respective rolls of picture film, corresponding guide track and virgin magnetic film are loaded respectively onto the film projector (not shown), the magnetic film reproducer 14 and the magnetic film recorder/reproducer 13. Signals from the actor's microphone 11 are routed through the audio console 12 to the embodiment 10, referred to in FIG. 1 as a post-sync dialogue signal processor, which also receives guide track audio signals from the guide track reproducer 14. An analog audio output which is a version of the signal from the microphone 11 edited into synchronism with the guide track audio signal from the guide track reproducer 14 by the embodiment 10 is supplied by the embodiment 10 to the recorder/reproducer 13 through the audio console 12. As in conventional automatic dialogue replacement, a post-synching session is started from the MTE 152 processor 15 which cycles the projector (not shown) and the guide track reproducer 14 through a selected designated loop section, starting 5 to 10 feet in front of the loop entry frame and then running at normal film speed through to the end of the designated loop section, the projector (not shown), the guide track reproducer 14, and the MTE 9E counter being supplied with interlock pulses from the interlock generator 16 under the control of the MTE 152 processor 15. The interlock pulses are also supplied to the MTE 600 recorder/reproducer 13, but recording by this recorder/reproducer 13 is controlled by the post-sync dialogue signal processor 10. The film footage and frame numbers are tracked conventionally by the counter 17 and AHEAD OF LOOP, IN LOOP, and PAST LOOP signals are provided by the pre-set unit 18 and supplied to the MTE 152 processor 15 in the known manner. Motion commands supplied to the interlock generator 16 by the MTE 152 processor 15 are the known fast forward and reverse, normal film speed forward and reverse, stop and the other standard commands provided by the MTE 152 processor for the MTE 8LB interlock generator. The MTE 152 processor MASTER RECORD and record/playback status signals which are under operator control are supplied to the post-sync dialogue signal processor 10 which utilizes these signals in its processing. The MTE 600 recorder/ reproducer 13 also produces a SYNC SPEED FORWARD signal when it is running at normal speed forward and this signal is supplied to the dialogue signal processor 10 for utilization. The BCD film footage and frames number signal generated by the counter 17 is supplied to the dialogue signal processor 10 to provide data utilized in the processing.

FIG. 2 shows schematically the post-sync dialogue processor 10 which embodies the invention. As shown in FIG. 2, the signals supplied to the processor 10 by the Magna-Tech Electronic units 13, 15 and 17 are inputs to a circuit referred to herein as a Magnatech interface 19 which is shown in FIG. 5 to include a multiplexer 20 for converting the 6-digit BCD footage and frames signal from the counter 17 into a single digit parallel input to a first single-board computer SBC1, shown in FIG. 2, having a 128 kilobyte memory and controlling the multiplexer 20, receiving through respective buffers 21 of the interface 19 the system status record and playback signals and the master record and sync speed forward signals, and outputting through a further buffer 22 of the interface 19 a master record signal to the recorder/- reproducer 13. The MTE 152 processor 15 is enabled by this arrangement to serve as a master console.

During a cycle of a designated loop section, with RECORD mode selected at the MTE 152 processor 15, the next signal of interest is MASTER RECORD active. This signal is generated by the MTE 152 processor 15 if the conditions RECORD MODE SELECTED, SYNC SPEED FORWARD COMMANDED, and IN LOOP active are all present and corresponds to detection by the pre-set unit 18 of the exact footage/frames of the start of the designated loop section. At this point the following instructions are carried out:

1. Read BCD start footage/frames and store in memory in the first computer SBC1.
2. Send message to the time warp processor computer SBC2, to start, and store time warping path and classification in memory in the computer SBC2 for access by the first computer SBC1 to generate editing data which is then stored in the memory in the first computer SBC1.
3. Reset analog-to-digital unit 28
4. Enable interrupt from analog-to-digital unit 28 when MASTER RECORD is off i.e. not active
5. Wait for data from SBC2 to commence editing.

When MASTER RECORD is turned off by the MTE 152 processor, corresponding to the finish frame of the designated loop section, the following instructions are carried out:

1. Read BCD finish footage/frames and store in the memory in the first computer SBC1.
2. Carry on digitising dub for 2 seconds.
3. Empty last data buffer in analog-to-digital unit 28, disable interrupt from analog-to-digital unit 28.
4. Compute number of last processing interval and send to SBC2.
5. Complete editing operations.

Having cycled once in the RECORD mode, the MTE 152 processor 15 jumps into PLAYBACK mode automatically at the loop finish point, and will then go into rewind to a point before the loop start and then enter normal speed forward. The next signal of interest is the SYNC SPEED FORWARD generated by the recorder/reproducer 13. Monitoring of this signal by the dialogue signal processor 10 prevents a digital to analog output of the edited dub when the BCD footage/frames position matches the stored loop start point as the MTE 152 processor 15 effects fast wind back through the loop.

When the SYNC SPEED FORWARD signal is received, (the MTE 152 processor 15 mode already being PLAYBACK): the following are carried out:

1. Pre-load data buffer of digital-to-analog unit 29 with mute on, (see description of FIG. 21 hereinafter).
2. Match BCD footage/frames with loop start frame in memory (use least significant bit of counter to strobe the footage counter bits).

When the loop start frame is reached:
1. Supply MASTER RECORD signal to recorder/reproducer 13 from the processor 10.
2. Reset buffer address pointer to zero, and turn mute off, (output begins).

At loop finish point:
1. Switch off MASTER RECORD signal from processor 10.

No part of the dub will be lost on magnetic film since although in the RECORD mode the actor may have been speaking after the loop finish point, this speech will have been warped back to within the loop section by the dialogue signal processor 10.

The first single-board computer SBC1 is coupled to a similar second single-board computer SBC2 for i/o port handshakes for interboard communication by a bus 23, and both computers SBC1 and SBC2 are connected to a multibus 24 for two-way traffic of data, address and control signals. To provide adequate storage for the dialogue processing to be effected an 84 megabyte Winchester disc store 25 is coupled to the multibus 24 by a disc controller 26. The first computer SBC1 serves as system controller and as a signal editor in editing processes to be described hereinafter. The second computer SBC2, which also has 128 kilobytes of memory, serves to carry out time warping processes. The computers SBC1 and SBC2 may each be an SBC 86/30 by Intel Corporation. The multibus 24 can then be a multibus card frame SBC 608 by Intel Corporation, and the disc controller 26 an SBC 220 by Intel Corporation. The disc storage 25 may be an M23128K by Fujitsu.

A visual display unit (VDU) and data entry terminal 27 is coupled to the first computer SBC1 to allow processing parameters chosen by the user to be entered into SBC1.

Audio signals from the actor's microphone 11 routed by the audio console 12 to the post-sync dialogue signal processor 10 enter as analog input to an analog-to-digital converter unit 28 shown in more detail with a digital-to-analog converter unit 29 and a shared buffer 30, bus interface 31 and control unit 32 in FIG. 3. The bus interface 31 couples the buffer 30 and control unit 32 to a data and control bus 33 connected to the multibus 24. When the bus interface 31 is enabled by a respective signal from the multibus 24, control signals are passed through the bus interface 31 to the control unit 32 which controls a sample and hold circuit 34 and an analog-to-digital converter 35. Microphone signals pass through a buffer amplifier 36 to a low pass filter 37 before reaching the sample and hold circuit 34. The signal samples produced in the sample and hold circuit 34 are digitized by the converter 35 and the digital output is supplied to the buffer 30, which is large, for accessing by the first computer SBC1. The control unit 32, bus interface 31 and buffer 30 also take part in the outputting of edited dialogue data, this data being transferred from the data and control bus 33 by the bus interface 31 to the buffer 30 and thence to a digital-to-analog converter 38. The analog output from the converter 38 is supplied to a de-glitch amplifier 39, which is a known circuit for removing non-speech transient components resulting from digital-to-analog conversion, and the output from the de-glitch amplifier 39 is passed through another low pass filter 40 to an audio output amplifier 41. The analog audio output from the output amplifer 41 is the output supplied by the dialogue signal processor 10 to the MTE 600 recorder/reproducer 13.

The audio input signal from the actor's microphone is also supplied to one of two identical speech parameter extraction processors 42 and 43, inscribed DUB PARAMETER EXTRACTION PROCESSOR. The other parameter extraction processor 43, inscribed GUIDE TRACK PARAMETER EXTRACTION PROCESSOR, receives the audio output signal from the MTE 600 guide track reproducer 14. The guide track parameter extraction processor 43 will be described in more detail hereinafter with reference to FIG. 4. The two parameter extraction processors 42 and 43 are coupled to the multibus 24 by a bus interface 44.

In a post-synching session, the Magna-Tech 152 Processor 15 cycles through a designated loop section, during which the actor attempts to speak his lines of dialogue in imitation of the signal on the guide track, the corresponding length of picture film being synchronously projected for the actor to see. At the loop entry point in this first cycle, the actor, having received a visual or aural cue, begins speaking. The actor's microphone 11 is connected to the analog-to-digital converter unit 28 so that as he speaks, the speech signal produced by the microphone 11 is digitised by the converter 35 and stored in the magnetic disc store 25. This digitising begins at the precise moment of loop entry and continues, the footage/frame of the entry point having been entered into memory of the first computer SBC1. The actor's microphone is also connected to the dub parameter extraction processor 42, the guide track parameter extraction processor 43 is connected to receive the guide track audio signal from the guide track reproducer 14, and at the same time in the two computers, SBC1 and SBC2, analysis and processing of the actor's and guide track speech signals and generation of editing data can begin, and the editing data so produced be entered into the memory of the first computer SBC1. At the loop finish point, the BCD footage/frame is entered into memory and the digitising, storage and analysis of the actor's speech continues for about two seconds after the loop finish point in case he is still speaking. The processing of the actor's and guide track speech data continues during the fast rewind phase of this first cycle of the designated loop section and is completed, possibly during the rewind.

This first cycle is repeated if the actor's performance is not satisfactory.

The next step is a second or further cycle through the designated loop section during which the actor's speech data stored in the disc store 25 is read out, edited by the first computer SBC1 in accordance with the stored editing data and converted by the digital-to-analog converter unit 24 into an analog signal and thence by a studio loudspeaker unit (not shown), including any necessary amplifier stages, into an audible speech signal. The adequacy of the new speech signal generated, in the form of the digital data stored in the disc store 25 and edited by the first computer SBC1, as dialogue for the film is assessed by the director and actor during this second cycle. At the same time the analog signal is supplied to the magnetic film recorder/reproducer 13 which records the new dialogue onto the virgin magnetic film, the system activating and de-activating the record function of the recorder/reproducer 13 at the loop entry and exit points respectively provided the sync speed forward signal is active. If the new dialogue is satisfactory, a start is made on the next designated loop section. If, however, the edited data does not give a satisfactory effect with the picture film, the process is repeated.

In FIG. 6 which is a block diagram representing the digital data processing carried out by the dialogue processor 10, data processing steps are indicated by legends within blocks, so that the blocks with such legends may be representative of processes carried out by a computing system, or of hardware units for carrying out such processes, or in some cases such hardware units and in other cases processes carried out by a computing system cooperating with the hardware units.

In FIG. 6, the guide track analog signal is mathematically represented as a function $x_1(t)$ of an independent variable t which is a measure of time, and the analog signal from the actor's microphone 11 is mathematically represented as another function $x_2(t')$ of another independent variable $t'$ which also is a measure of time in the same units as the variable t but of independent origin.

The generation of the speech parameters from the recorded guide track and the dub involves processing by and the periodic output of parameters from the two extraction processors 42 and 43. These parameters are stored at least temporarily until they are processed as data sequences in the processing apparatus. One set of data-sequences is generated for the designated guide track loop and another is generated for the spoken attempt (the dub) by the actor. Evaluation of minor timing variations between these data sequences takes place using a pattern matching algorithm based upon dynamic programming techniques used in speech recognition systems. Once time-warping data is generated, then digital editing of the computer-stored speech waveform data can commence. Editing decisions are based on algorithms designed to allow minimum perceivable disturbance to the audible speech sound quality whilst apparently achieving perfect synchronism in relation to mouth movements visible from the projected film pictures.

In post-synching, during the cycle in which the actor speaks, generation and processing of speech parameters from both the guide track signal $x_1(t)$ and the microphone signal $x_2(t')$ takes place. The generation of the speech parameters for the guide track signal $x_1(t)$ and dub signal $x_2(t')$ is represented in FIG. 6 by blocks 45 and 46 respectively.

This parameter data may optionally be stored on disc for later retrieval and processing or as it is generated it may be immediately processed in a block 47 inscribed GENERATE TIME WARPING PATH to produce time alignment data, referred to herein as a time warping path, which describes how best to align significant features of the dub with corresponding features of the guide track. In addition, segments of the dub are classified as speech or silence in a process block 48 from some or all of the parameter data. When a sufficient amount of time alignment data is available, it is used in a process block 49 inscribed GENERATE EDITING DATA in conjunction with the classification data from block 48 and, if necessary, fundamental period data of voiced dub segments, from a block 50, to permit microediting, i.e. editing of the fine structure, of the digitised stored dub waveform (retrieved from the disc store 25) to take place in a process 51 where it is required in the dub waveform. Any new edited waveform segments can be stored in a second part of the disc store 25 and a 'table' of editing operations can be prepared for constructing the complete edited waveform during the next step from the stored edited waveform segments. The processing just described continues for a few seconds beyond the loop exit point to ensure that if the actor is speaking too slowly, the end of the speech will not be cut off and lost.

If the parameter data has been stored on disc, all of the above processing of the parameter data and microediting may continue during the rewinding of the picture film and guide track and possibly during the playback step described next. If the parameter data is not stored, it must be processed at an average real-time rate sufficient for production of the time warping path and the classification data in blocks 47 and 48. However, if the time-warping path is stored in memory the processes of deriving the fundamental period data (block 50), generating editing data (block 49), and editing (block 51) the replacement signal may continue during the fast rewind and playback phase of the second cycle. The main requirement is that any part of the dub data to be played back must be completely processed before it is played back.

The selection of the specific types of processing used to analyse the guide track signal $x_1(t)$ and the dub signal $x_2(t')$ and thereby generate parameters once every T seconds where T seconds is a suitably short interval, is somewhat arbitrary in that numerous parameters reflect the underlying time-varying nature of speech. Measurement operations may be grouped conveniently according to the computational method which is used to produce the parameters. In general, three useful categories exist.

In the first, if sampled versions of both signals $x_1(t)$ and $x_2(t')$ are made available by some means, parameters can be generated by parallel processing of blocks of (stored) samples of these signals. For each signal, the blocks of samples may or may not be overlapped, depending on the amount of independence desired between blocks of samples. Among the most commonly used sample-block-oriented parameters for speech pattern matching are the short-time zero-crossing rate, short-time energy, short-time average magnitude, short-time autocorrelation coefficients, short-time average magnitude difference function, discrete short-time spectral coefficients, linear predictive coefficients and prediction error, and cepstral coefficients. Details of the definitions and procedures for calculating each of the preceding short-time parameters are found in "Digital Processing of Speech Signals" by L. Rabiner and R. Schafer, published by Prentice-Hall of Englewood Cliffs, N.J., U.S.A. in 1978.

The second category contains measurement operations which can be performed by periodically scanning and sampling (once every T seconds) the outputs of analog filter banks analysing $x_1(t)$ and $x_2(t')$. Several such speech analysis systems are described in "Speech Analysis Synthesis and Perception. Second Edition" by J. L. Flanagan published by Springer-Verlag of Berlin, Germany in 1972.

A third category of processing operations contains those which are sampled-data or digital signal processing implementations of continuous-time analysis systems, the outputs of which may be sampled every T seconds. A typical example (which is in fact the one used in the embodiment described herein) is a parallel digital filterbank, designed and implemented as described in references such as "Theory and Application of Digital Signal Processing" by L. R. Rabiner and B. Gold published by Prentice-Hall of Englewood Cliffs, N.J., U.S.A. in 1975. This category requires (as in the first) that sampled versions of the two signals $x_1(t)$ and $x_2(t')$ are made available.

It is also possible to use parameters in any combination from the preceding types of periodically-made measurements. However, the selection of the number of parameters used can vary and generally depends on the following consideration:

Where the signal of interest $s_1(t)$ in the reference signal $x_1(t)$ is degraded by noise and filtering effects, measurement of a large number of parameters permits more reliable comparisons to be made between the reference and replacement signals $x_1(t)$ and $x_2(t')$. The type and degree of degradation influences the choice of parameter to be used in subsequent stages of processing. If the reference signal $x_1(t)$ consists purely of the signal of interest $s_1(t)$, only a few parameters are required for use in subsequent processing operations.

Lastly, if a variety of types of parameters are generated, and each of these parameters is described by numbers lying within a particular range, a means must be provided which normalizes each parameter so as to provide substantially equal numeric ranges for each normalized parameter. Such a normalization procedure is needed to ensure that the contribution of each parameter to the pattern matching process which generates the time alignment data will be roughly equivalent.

The main criteria for the selection of parameters are that successive samples of any parameter should: (a) reflect significant changes within a speech signal which relate to physical aspects of the production of the speech; (b) be generated efficiently in hardware or software at a rate significantly lower than that required to sample the dub waveform; and (c) not be easily contaminated by noise.

The rate ($T^{-1}$ seconds $^{-1}$) at which sets of parameters are generated in parallel is referred to hereinafter as the 'data frame' rate (as distinguished from the film frame rate) or simply 'frame' rate when no confusion can arise. Thus the data frame rate is the rate at which parameter vectors are generated. Therefore, once during each data frame period, parallel processing operations take place for both the guide track and the dub, and these processing results are then grouped into two respective data units which will be referred to as the guide (or reference) parameter vector and the dub (or replacement) parameter vector.

In FIG. 6 various forms of signals are represented by different types of lines connecting the blocks: solid lines represent full bandwidth analog or digital signal routes; broken lines represent the routes of data sampled at the frame rate; and double broken lines represent parallel data routes.

The reference signal $x_1(t)$, which in this example is the output of the guide track magnetic film reproducer 14 is played back, and at the same time the replacement signal $x_2(t')$ which in this example is the output of the microphone 11, is passed through the low pass filter 37 (FIG. 3) to the analog-to-digital converter 35. The filter 37 has a cutoff frequency, $f_c$, which is located at the highest frequency to be reproduced. The sample and hold circuit 34 samples the filtered signal at intervals of D seconds, giving a sampling rate of $D^{-1}$ seconds $^{-1}$ of more than twice the highest frequency to be reproduced. For the present example, a bandwidth of 15 kHz ($=f_c$) is sufficient and D is chosen to be $32000^{-1}$ sec. The sampling and conversion process produces a stream of digital data $x_2(nD)$ where $n = 0,1,2 \ldots$, representative of the signal $x_2(t')$. The data stream $x_2(nD)$ is written to disc 25 where it is held to be available for further processing. While the signal $x_2(t')$ is being sampled and written to disc, it is simultaneously processed by the block 46 inscribed GENERATE PARAMETERS. Similarly, the signal $x_1(t)$ is simultaneously processed by the block 45. One of these two identical blocks 45 and 46 is represented in further detail in FIG. 4.

In the present embodiment, a reference signal parameter vector $A(kT)$ is formed in each guide track signal frame k, where $k = 1,2,3 \ldots$ from the sampled and logarithmically-coded outputs of the guide track parameter extraction processor 43, which contains an N-channel digital filterbank. Simultaneously, in a parallel process, a replacement signal parameter vector B(jT) is formed in each frame j, where j,=1,2,3 . . . from the sampled and logarithmically-coded output of the dub parameter extraction processor 44 which contains an N-channel digital filterbank. The two filterbanks have identical characteristics. The parameter vectors for the frame j=1 and k=1 are produced at the end of the first period of T seconds and it will be assumed that the respective signals of interest start after this first frame.

In FIG. 4 the details of the generation of A(kT) from $x_1(t)$ are presented. The generation of B(jT) from $x_2(t')$ is performed identically and is therefore not shown or discussed separately.

As shown in FIG. 4, the input signal $x_1(t)$ first passes through a variable gain amplifier stage 52 of gain G that is adjusted to ensure that a large proportion of the dynamic range of an analog-to-digital converter (A/D-C) 53 is used without clipping. The amplified analog signal passes through a high-frequency boosting circuit 54 (inscribed HF BOOST), providing +6 dB/octave gain from 1 kHz to 4 kHz, which compensates for the rolloff of high-frequency energy in speech signals. The resultant signal passes through a lowpass filter (LPF) 55 (e.g. a 7th-order elliptic design with passband cutoff at 4 kHz, transition width 1.25, passband ripple 0.3 dB, and minimum stopband attentuation of 60 dB) and the resulting filtered signal $x_1'(t)$ (where here the prime indicates a filtered version of $x_1$) is digitized by a combination comprising a sample-and-hold device (S/H) 56 followed by the converter 53 which is in this example a 12-bit A-to-D converter (A/D-C) operating at a sampling frequency of $(cD)^{-1}$ Hz to produce sampled data stream $x_1'(mcD)$ where m=0,1,2 . . . . The constant c should be an integer in order that the rate $(cD)^{-1}$ be integrally related to the rate $D^{-1}$ used to sample the replacement signal for storage, editing, and playback. By this means, synchronicity is maintained between the sampled signal $x_2'(nD)$ and the frame indices j and k. The use of c=4 (and therefore $(cD)^{-1}=8$ kHz) allows a reduction in bandwidth and sampling rate and thus provides considerable economy in the processing required to generate the parameters. At the same time, very little significant information is lost.

The data stream $x_1'(mcD)$ enters a digital filterbank 57 comprising N parallel bandpass filter sections BPFi, where i indicates a frequency band number. In the present system N=4 and the filters used are recursive implementations of 4th order Butterworth-designed bandpass filters with the following cutoff (−3 dB attentuation) frequencies:

| Band Number | Lower Cutoff | Upper Cutoff |
|---|---|---|
| 1 | 250 Hz | 500 Hz |
| 2 | 500 Hz | 1000 Hz |
| 3 | 1000 Hz | 2000 Hz |
| 4 | 2000 Hz | 4000 Hz |

The design and implementation of such filters is well known and is described, for example, in "Theory and Applications of Digital Signal Processing" by L. R. Rabiner and B. Gold published by Prentice-Hall of Englewood Cliffs, N.J. in 1975.

The permitted aliasing of a small range of frequencies in $x_1'(mcD)$ above 4 kHz into the high frequency band (i.e. band 4) is unusual but desirable in that any speech energy above 4 kHz may make a useful contribution to the pattern matching processes to follow.

The output of each bandpass section BPFi is processed identically as follows. Each BPF output is full-wave rectified in a block FWRi, and the rectified signal passes through a lowpass filter LPFi comprising two first-order leaky integrators in series, each with cutoff frequency at approximately 10 Hz. This filter smoothes the input signal and allows the resulting output to be sampled by a switch represented schematically in FIG. 4, every T seconds where T=0.01 sec. Lastly, the sampled output data is converted in a block LOG (by means of a look-up table) into an 8-bit logarithmic quantity $A_i(kT)$ where the subscript i indicates the ith band. Thus, $A_i(kT)$ is one of the N components of a normalized parameter vector. Sequential access of these components, whose ranges are directly comparable, is then carried out in a block 59 inscribed FORM PARAMETER VECTOR, which is a multiplexer, to form the complete parameter vector A(kT).

The movement of the parameter vector data from the filterbank processor 43 to the next processing stage is accomplished by storing the sequential parameter vectors (comprising four bytes per frame per channel or eight bytes per frame, total) in one of two large RAM buffer memories 60 and 61 (BUFFER MEMORY 1 and BUFFER MEMORY 2), each holding an integral multiple number R of parameter vectors. When one of these large buffers 60 and 61 becomes filled, new parameter vectors are then directed into the other buffer. Furthermore, while the second buffer fills, the processor SBC2 performing the generation of the time warping path may access the filled buffer and initiate the movement of the contents to a further storage area for eventual access during process. After the data has been transferred from a filled buffer 60 and 61, that buffer may be overwritten with new data. Such a double-buffered system ensures no data is lost while data transfers are being made to subsequent processing sections. It should be noted that the use of a double-buffered memory for storing R parameter vectors means that after filling one buffer, if the kth parameter vector is the first one to be stored in one buffer, the (k-1-R)th to the (k-1)th parameter vectors will then be immediately available from the previously filled buffer. Consequently, subsequent processing of the parameter vectors will not strictly be in real-time, but the processing may operate at a real time rate on a variable-delay basis. The alternate operation of the buffers 60 and 61 is represented schematically in FIG. 4 by ganged switches 62.

TIME WARPING PROCESSOR DESCRIPTION

The operation represented by the process block 47 (FIG. 6) inscribed GENERATE TIME WARPING PATH will now be described in detail. This operation is carried out by the second single board computer SBC2. The time warping path is produced by processing the guide and dub parameter vectors to find (on a frame-by-frame basis) the sequence of dub parameter vectors that best matches the fixed sequence of guide parameter vectors by allowing dub frames to be repeated or omitted. In this embodiment, the parameter vectors represent spectral cross sections of the guide and dub speech signals. To make comparisons of the similarity between a dub and a guide spectral cross section, a simple distance metric can be used which compares not the original parameter vectors, but ones that have been processed to emphasize mainly the differences in speech patterns and to not be sensitive to environmental or recording conditions. The dub frame index sequence, i.e. the sequence of values of j, which produces the best alignment of dub parameter vectors with those of the guide defines the time warping path which will be input to the editing operations of block 49.

It should be noted that herein the term 'metric' means a mathematical function that associates with each pair of elements of a set a real non-negative number constituting their distance and satisfying the conditions that the number is zero only if the two elements are identical, the number is the same regardless of the order in which the two elements are taken, and the number associated with one pair of elements plus that associated with one of the pair and a third element is equal to or greater than the number associated with the other member of the pair and the third element.

The time warping path, which is a function of k and T and is written w(kT), may be more formally specified as a non-decreasing function of the data frame indices k of the reference signal parameter vector A(kT) with the following two properties: First, for k=1,2,3 ..., K, w(kT) is a sequence of integers in the range from 1 to J inclusive, where K and J are defined as the final frame indices of the reference signal and the replacement signal respectively. (Generally, if the parameterization of the reference and replacement signals takes place simultaneously, J=K). Secondly, w(kT) describes the best or optimal match of a sequence of replacement parameter vectors B(w(kT)) to the reference sequence A(kT). Consequently it will be assumed that w(kT), being the best match of replacement parameter vectors to reference parameter vectors, also describes as a function of time the distortion (i.e. stretching or compression) of the time scale of the replacement signal $x_2(t')$ that will align, in time, significant time-dependent features in the replacement signal $x_2(t')$ with the corresponding features in the reference signal $x_1(t)$.

Owing to the fact that the reference and replacement signals $x_1(t)$ and $x_2(t')$ are expected to be of fixed (but arbitrarily long) length, it is possible to represent the function w(kT) as a finite length path in the (k,j) plane. An example of a time warping path which provides the best match of a one-dimensional replacement vector to a one-dimensional reference vector is provided in FIG. 7. By a one-dimensional vector is meant a vector produced from a single parameter, i.e. N=1.

Because the k index represents the reference sequence, to which a sequence of indices on the j-axis will be assigned, path boundary conditions are rather loose in that there is some $j_o$ such that at k=1, $j_o$=w(1T) and $1 \leq j_o \leq J$. Similarly, there exists some $j_F$=w(KT) such that $j_o \leq jF \leq J$. It will be apparent to those skilled in the art that it is unnecessary for the path to start at j=1 and end at j=J. However, there must be a total of K path values, i.e. values of w(kT).

The procedures used to discover the best of the enormous number of possible paths are, in part, derived from known word recognition techniques. In such techniques, a matching algorithm is used which, if no constraints were imposed, would be capable of allowing any replacement parameter vector B(j) to be compared with any reference parameter vector A(k) to give a measure of distance (or dissimilarity) denoted by d(k,j) between the two vectors. One useful definition of d(k,j) is a weighted "city-block" difference in the N-dimensional parameter space, i.e. d(k,j) is defined by:

$$d(k,j) = \sum_{i=1}^{N} |B_i(jT) - A_i(kT)| \, r_i(kT)$$

where $r_i(kT)$ is a weighting factor for the kth frame and is discussed hereinafter. Other distance measures, e.g. the squared Euclidean distance between the vectors, can be used. It will be seen that the value of d(k,j) will vary with j when k is constant.

Similarly, the sum of the values of d(k,j) when k is varied over its respective range 1 to K may be used to provide a score which varies when the values chosen for j for each particular value of k are varied. Scores accordingly furnish a useful numerical assessment of the matching of a test sequence of replacement frames to the fixed sequence of reference frames. Moreover, there is a minimum or best total score as k is varied from 1 to K and j from $j_o$=w(1T) to $j_F$=w(KT).

Given that the path starting point for determining the optimum score is fixed at k=1, the score is dependent only on the final frame index, K. Therefore the optimum score may be denoted by S(K) where $$S(K) = \min_{(j(k))} \left[ \sum_{k=1}^{K} d(k,j(k)) \right]$$

and the notation for min indicates that the summation is to be taken over indices j (which are themselves a particular function of k) such that the resulting summation is minimized. Hence to find the best matching of the two sets of K vectors it is necessary to determine the sequence of K optimum values of j (with appropriate path constraints) which minimize the above summation S(K). The particular function of k which provides this minimum over the range k from 1 to K is the formal definition of the optimum time warping path w(kT). Other time warping functions are also described by C. Myers, L. Rabiner and A. Rosenberg in "Performance Tradeoffs in Dynamic Time Warping Algorithms for Isolated Word Recognition" in volume 28, issue No. 6 of IEEE Transactions on Acoustics, Speech and Signal Processing, at pages 623 and 635, published in 1980.

In frame K, the optimal path can only be known to be optimal after A(KT) and B(JT) have been processed in the matching process. Furthermore, where continuous speech is being parameterized, K may often by on the order of several thousand. Consequently it is necessary to drastically reduce the storage and processing of the vast amount of data which would be demanded in a direct implementation of the above formulae for an exhaustive search for the optimum path. This can be accomplished through the use of a modified version of an efficient processing algorithm for generating time registration data for two substantially similar continuous speech signals that was presented by J. S. Bridle in a paper entitled "Automatic Time Alignment and its Use in Speech Research" presented at the Leeds Experimental Phonetics Symposium, 27th to 29th September, 1982 at Leeds University, West Yorkshire, England.

The original algorithm developed by Bridle will now be briefly described before the modified version is described. Bridle's algorithm, known as ZIP (owing to its action of "zipping" two similar signal sequences together) operates by producing a restricted number of potentially optimum path segments in parallel and pruning away the most unlikely candidates which have the highest (worst) dissimilarity scores. The production rules for extending the ends of the path segments are governed by principles of Dynamic Programming, constraints on the size and direction of path increments, and penalties for local time scale distortion. The optimum path is discovered in segments as the poor candidates are gradually pruned away, i.e. rejected, to leave longer and longer path segments which will eventually have origins that merge into a unique segment containing one or more path elements common to all remaining paths. If the pruning is done judiciously, the common segment is part of the optimum path w(kT), and can therefore be output as such up to the point where the path segments diverge. As the processing continues, for each reference frame processed, the path is extended one increment, since k increases by units; the necessary pruning takes place; and the origins of the remaining paths are examined for uniqueness. However, outputting of optimum path segments takes place only when the beginnings, i.e. ends not being extended, of the path segments satisfy the requirement of convergence; thus the output of path elements will generally be asynchronous with the processing of reference frames.

The production of the time warping paths in the ZIP algorithm is efficiently performed by applying an algorithm similar to those frequently used to compute optimum scores in word recognition systems. A known word recognition system is described by J. S. Bridle, M. D. Brown and R. M. Chamberlain in an article entitled "A one-pass algorithm for connected word recognition" at pages 899 to 902 of the Proceedings of the IEEE International Conference on Acoustics, Speech and Signal Processing, Paris, May 1982. However, unlike word recognition algorithms, the optimum score discovered along the optimum path is not the end product of ZIP, but the optimum path is. Consequently, ZIP is designed to process a number of paths starting from different origins in parallel, with each path produced describing the best sequence from the starting to the final point. To explain this processing a partial path score will now be discussed.

By a simple extension of the preceding definition for the optimum score $S(K)$, it is possible to define an optimum partial path score, $S_p$, for the path connecting any starting point $(k_s,j_s)$ to any end point $(k_e,J_e)$ (where $k_s < K_e$ and $j_s \leq j_e$) as the minimum possible sum of the distances $d(k,j)$ for the range of k from $k_s$ to $k_e$ and the range of j from $j_s$ to $j_e$: i.e.

$$S_p(k_s,j_s;k_e,j_e) = \min_{(j_s,j_e,j(k))} \left[ \sum_{k=k_s}^{k_e} d(k,j(k)) \right]$$

The function of k that generates the sequence of j which minimizes this score and therefore describes a best partial path segment is dependent upon $j_s$ and $j_e$ and may be written as $w_{j_s,j_e}(kT)$. It should be appreciated that for a given $j_s$ and $j_e$, only one sequence of j will describe the best path over a fixed range of k. That means there will be only one best path segment between any two points in the (k,j) plane. Moreover, $w(kT) = w_{j_0,j_F}(kT)$.

The search for paths which produce the minimum scores is carried out in ZIP via a Dynamic Programming (or recursive optimization) algorithm. In Dynamic Programming (DP) algorithms, two main principles are used in determining $S(K)$ and hence $w(kT)$: (1) the optimum set of values of j for the whole range of k from 1 to K is also optimum for any small part of the range of k; and (2) the optimum set of values of j corresponding to the values of k from $k_s$ to any value $k_e$ for which there is a corresponding $j_s$ and $j_e$ depends only on the values of j from $j_s$ to $j_e$.

Using these principles, ZIP generates values of the best partial score according to the following recursive DP equation:

$$S_p(k_s,j_s;k_e,j_e) = \min_{(a=0,1,2)} [S_p(k_s,j_s;k_e - 1,j_e - a) + d(k_e,j_e) + P(a)]$$

in which a function $P(a)$ is included so that the score will include a penalty for local timescale distortion. The above equation for $S_p$, which is referred to hereinafter as a DP step, constrains the maximum path slope to be 2; thus the maximum replacement signal compression ratio will be 2:1.

The key aspect of the DP step is that the best step to a new end point at $k=k_e$ is found by starting at the new end point and searching backwards to at most three previous best path ends at $k=k_e-1$ and connecting the new end point to the path which generates the best (i.e. lowest) score. This is illustrated in FIG. 8 which depicts the allowed paths in the (k,j) plane to a point (k,j) in the DP step. In particular, if $a=0$, signifying that a replacement frame is repeated (i.e. a horizontal step in the (k,j) plane), or if $a=2$, signifying that a single replacement frame has been skipped (i.e. a lower diagonal step in the (k,j) plane), different (positive) penalties are included. For $a=1$ (i.e. a diagonal step in the (k,j) plane) no penalty needs to be included.

Since there is no formal restriction on the amount of expansion by repetition that the path can introduce, the penalty for $a=0$ is generally set higher than that for $a=2$.

The basic means by which ZIP examines a number of path ends in parallel will now be described below with reference to FIG. 9. Some features of ZIP will be omitted here for simplicity. Initially, as illustrated at (a) in FIG. 9, L consecutive values of $j_s$ from $j_s=1$ to $j_s=L$ are taken at $k_s=1$ as the first elements of L different paths. Because this is the first step, these L consecutive values temporarily also define the end points of each path and can therefore be regarded as making up a window of elements for which certain data must be kept to compute the DP step. Several data arrays are used to hold the required data. First, for each new possible path end within the window, a corresponding path score will be kept in a data array named SCORE. The scores for the L different paths are all initially set to zero. Next, L+2 distances are independently computed betweeen the reference vector at $k=1$ and the vectors of each of the first L+2 replacement frames from $j=1$ to $j=L+2$. These distances are held in a second data array name DIST. The two extra distance measures are made available to enable the DP step to extend the path ending at (1,L) along the lower diagonal in the (k,j) plane to (2,L+2). This action of extending the window by two units of j at each step of k steers the top of the path exploration window up (towards higher j) at a maximum slope of 2:1 as is illustrated by the graphical representations of the (k,j) plane at (a), (b) and (c) in FIG. 9.

At the bottom of the window, i.e. below $j=1$, the non-existence of path ends and scores means that the DP step is restricted to not test the $a=1$ or $a=2$ step when j = 1 and, similarly, to not test the a=2 step when j=2.

Using the computed distances and the array of previous scores, ZIP computes a new best score independently for each of the L+2 new endpoints using the DP equation and, at the same time, saves in a two-dimensional array of path elements named PATH the corresponding index of j which provided each best step.

The index indicates the frame index from which the best step was made; therefore each index is actually a pointer to the previous frame's path end. Successive pointers generate a path which can be traced back to its origin. The PATH array holds a multiplicity of such strings of pointers.

After the first DP step, the first column in PATH is simply filled with the indices of j from 1 to L+2. This is illustrated in FIG. 9 where the portion of the (k,j) plane is shown at (a), (b) and (c) with broken lines indicating an imaginary window around the endpoints of the path elements in the previous step. The SCORE, DIST and PATH arrays are shown at (a), (b) and (c) with typical data held after the DP step has been made for k=1, 2 and 3 respectively.

Each element in the SCORE array corresponds to a unique path end and sequence of previous path elements which led to that score. Each unique path is held as a row in the PATH array with the same index as the corresponding score in the SCORE array.

With reference to FIG. 9 again the following cycle of processes is carried out. After the L+2 DP steps have been made and the new path ends have been saved in PATH, ZIP advances k to the next reference frame; computes a new set of distances between the new reference vector and each of the vectors of the replacement frames that will be needed in the DP steps; extends all the paths using the DP step equation, the array of distances and the array of previous scores; and thereby generates a new set of scores and the next path end elements corresponding to the new best scores. These path ends are appended to the appropriate path element sequences in PATH. This cycle, with the addition of some further processing to be described next, is repeated (as shown at (b) and (c) in FIG. 9) until the last reference frame is processed.

The choice of local path constraints in the DP step ensures that if the steps are computed by starting from the newest entries in SCORE and working backwards to the oldest entries, the paths cannot cross each other. They can, however, trace back to a common segment, as will be described hereinafter.

Without further processing, each path would grow in length by one unit for each DP step, and the number of paths, scores and distances would grow by two for each step, requiring a continually increasing amount of storage and computation which would be impractical for long signals.

ZIP avoids these problems by three different mechanisms:

A pruning technique effectively restricts the window dimensions by controlling both its top and bottom ends. For each reference frame, after the new set of scores and path endings are computed via the DP steps, all scores which are more than a predetermined amount (the threshold amount) away from the best score for that reference frame are omitted from further consideration. In addition, the path corresponding to each score thus pruned is also removed, and flags are set to prevent unuseable distance measures from being calculated in the next DP step. As long as the difference between the score along the true optimum path and the score of the currently optimum path (i.e. the path with the best score ending at the current frame) remains less than the threshold amount, the optimum path is never pruned. During this pruning computation the computed best score found for each input frame is set equal to the negative of the threshold value and the remaining scores are computed relative to this one, so that the range of possible scores is reduced considerably.

The possible maximum length of the paths is restricted to some relatively small number (e.g. 50) by maintaining sufficient storage to hold paths for as many reference frames as needed to allow the pruning to establish agreement between, i.e. convergence of, the starting elements of the remaining path segments on the optimum path for one or more path elements. The elements common to the remaining paths may then be output as w(kT) and the storage units in PATH which held these values can be released for further use.

The third mechanism to reduce storage is implementation of the score and distance arrays as circular (or "ring") storage areas. The two-dimensional path array is implemented to be circular in each of its two dimensions, and acts as a two-dimensional window which moves over the (k,j) plane substantially diagonally, containing the path segments under scrutiny, among which is the optimal one.

However, the recording conditions for film guide track signals are usually considerably different (e.g. noisy, reverberant, distant microphone placement) from those for a studio-recorded dub. Procedures used to find the distances between the reference and replacement vectors must therefore minimize the effects of these long-term signal differences but ZIP does not ensure this. Furthermore, the time warping path slope constraint in ZIP restricts tne maximum compression of the replacement signal to a ratio of 2:1, which can cause the computed best path to omit replacement frames in a segment of the replacement signal containing speech if this segment follows silence whose duration is more than twice that of a corresponding silence in the reference signal. The desired algorithm response is to allow silence in the replacement signal to be expanded or compressed with far fewer restrictions than speech.

These shortcomings are overcome in the preferred embodiment of the present invention by modifying the ZIP algorithm. The modifications rely upon three assumptions concerning the nature of the guide track and dub speech signals. (1) That in the first few seconds of input there are some frames in both signals in which speech is not present, so that, since parameter vectors represent spectral cross sections, the lowest output values from each filter band are produced from samples of the background noise. (2) That the guide track and dub signals (in conditions of signal-to-noise ratios in excess of 20 dB) nominally contain similar speech sounds, so that maximum levels reached in corresponding frequency bands should correspond to roughly the same speech sounds and should consequently provide reference levels for normalizing the spectral levels of these bands. (3) That the dub signal is input under nearly ideal (i.e. high signal-to-noise ratio) conditions, so that it is easy to detect whether or not a dub frame contains speech or background noise, whereas in contrast, the guide track signal may be heavily degraded by noise and unwanted signals.

The modified ZIP algorithm used in the preferred embodiment generates the time warping path by processing the parameter vectors on a continuous basis in three stages of processing. The first stage is an initialisation process which must be performed at least once. The main time warping path generation takes place in second and third stages.

In the first stage, illustrated in block form in FIG. 10, a large number of frames of both guide track and dub parameter vectors occupying 2 to 3 seconds, i.e. 200 to 300 frames, are analysed to produce estimates of long-term signal characteristics needed in the second and third stages. This long-term data is produced for each component of the parameter vectors. The first stage, which is in effect a first processing pass over some of the data, must be performed once before the main processing begins. In addition, it may be performed relatively infrequently (for example, once in every two or more seconds or in response to detected changes in signal characteristics) in order to update the long-term quantities.

In the second stage, illustrated in block form in FIG. 11, the dub parameter vectors are processed on a frame-by-frame basis (unlike in the first processing stage) in several different operations which utilize the first stage long-term data to: (a) classify the dub frames as containing speech or silence: and (b) carry out some of the processing which removes long-term spectral differences between the corresponding guide and dub bands, and equalises the useable (i.e. noise free) dynamic ranges. In addition, a number of working arrays for data are loaded with time-varying data related to the dub frames in readiness for use in the third stage. This time-varying data varies according to whether the respective dub frame classification is speech or silence and includes: (a) the preprocessed parameter vectors, which are resampled at twice the period of the original rate where successive dub frames are classified as silence: (b) the corresponding dub frame index numbers: (c) classification (speech/silence) indicators: and (d) the two penalties to be used in the Dynamic Programming pattern matching step.

In the third stage (illustrated in block form in FIG. 12), which is also performed once for each frame, an algorithm processes the data produced in the second stage and computes a number of potentially optimum time warping path segments for aligning the dub frames to those of the guide track. In further processing, the algorithm saves a limited number of the computed best of the paths and then, when these remaining path segments satisfy certain conditions (related to the uniqueness of their origins) the algorithm outputs a unique path segment which represents (when speech is present in the dub) the optimum path for time alignment. Alternatively, when silence is present in the dub for relatively large periods, a path is generated in such a way that dub silence may be compressed at a maximum rate of 4:1 by omitting frames, or extended indefinitely by repeating frames in the search for a best match of dub speech to the guide track signal.

Details of the First Stage

As indicated in detail in FIG. 10, the first stage provides a variety of non-time-varying data to be used in both the distance computation and the classification of dub frames as speech or silence. Firstly, in order to remove differences between the guide and dub filter-bank outputs that are attributable to differences in recording conditions, linear gain adjustments, and background noise spectra and which therefore are not related to differences in the speech spectra alone, a normalization of spectral levels and dynamic ranges is provided. In the present embodiment, this normalization is implemented by producing a lookup table for mapping each frequency band output range of the guide to that of the corresponding dub band. Secondly, a noise floor lower limit is set for each dub band. Thirdly, since in measuring differences between two spectra those differences occurring in the vicinity of spectral peaks should be emphasized and less emphasis placed on spectral differences at low levels, a table of weighting function values (to be accessed in the third stage) is prepared for each band. The input to this table will be the maximum of the guide or dub spectral level, and its output will be the appropriate value to use in the spectral difference weighting function. These preceding procedures are related to those outlined in the paper entitled "A Digital Filter Bank for Spectral Matching" by D. H. Klatt in the Proceedings of the International Conference on Acoustics Speech and Signal Processing, at pages 573–576, published in 1976.

The input value $A_i(kT)$ of a guide parameter vector component (i.e. a log-coded bahdpass output) in one frame will now be referred to as g—in and similarly, a dub input component $B_i(jT)$ as d—in. A specific band and frame is implied by g—in and by d—in. To accomplish the first stage processing, the following processing steps are taken for each frequency band in the dub and guide track separately (unless stated otherwise)

1. Using the first 200 frames of g—in, make a histogram (see FIG. 13 at (a)) in 1 dB—wide bins over the input range from 1 to 100 dB of the number of occurrences at a particular input level versus the input level (Blocks 63 and 64 in FIG. 10). Similarly, make a histogram of the same number of frames of d—in. (Blocks 65 and 66, FIG. 10).

2. Find the lowest bin (i.e. lowest input level in the histogram) which contains more than one entry and which is also not more than 6 dB below the next highest bin containing more than one entry. Identify this lowest bin as low—min.

3. Find the noise floor peak in the histogram by searching incrementally between low—min and low—min+15 (dB) for the histogram bin at which the sum of the contents of the test bin and the two adjacent (upper and lower neighbour) bins is a maximum. Identify the bin at which this maximum first occurs as low— peak. This value is used in steps 4 and 6 below.

4. For the dub only, set a speech/silence threshold value at the low—peak+12 (dB). This value is referred to as d—sp—thr and is used in the third stage. (See Block 74, FIG. 10).

5. Determine an average histogram maximum value by the following procedure:

(a) Starting from the highest bin (100 dB), search down towards the lowest bin for the first (i.e. highest) bin in which there are at least three entries or for the first bin in which there is at least one entry and within 3 dB below this bin there is another bin with at least one entry. Mark the highest bin meeting this criterion as high—max.

(b) Beginning at high—max, sum the contents of this bin and successively lower bins until 5% or more of the histogram distribution has been accumulated (e.g. 10 entries if 200 frames are being processed). This corresponds to 5% of the total histogram area. Mark the bin at which this condition is met or surpassed as high_min.

(c) Subtract from high_max the greatest integer part of (high_max−high_min+1)/2 to obtain the bin value which will be marked as g_high_avg for the guide track band and d_high_avg for the dub. The respective values should mainly be related to the highest (but not necessarily peak) histogram values for the bands and should not be strongly affected by a small number of brief impulses that are higher than speech signal values. These values are used in steps 6 and 7.

6. Create a lookup table for use in the third stage that maps the guide track input range of values to a new set of values such that the long-term spectral differences between the dub and guide are removed and such that any input value falling below a computed noise floor common to both the guide and dub does not contribute unreliable information to the spectral distance calculation. This latter aspect removes the risk of obtaining an unwanted large dissimilarity score between a speech spectral cross section that is noise-free and a spectral cross section of the identical speech signal that is 'noise-masked' (i.e. corrupted by additive noise with spectral density higher than that of some of the corresponding speech bands). Table values are calculated by generating a function of the guide input values according to the following steps:

(a) Set a noise floor level at 4 dB above the value low_peak in this band. Set g_nflr to this value for the guide band and similarly set d_nflr to the corresponding value for the dub band. (See blocks 67 and 68 in FIG. 10).

(b) Compute a band dynamic range by subtracting the appropriate (dub or guide) noise floor level from the corresponding value of high_avg. Set g_range to the value for the guide track and d_range to the value for the dub. (See blocks 69 and 70 in FIG. 10).

(c) If g_range is less than d_range, then compute a new mapped dub noise floor level, map_d_nflr, equal to d_high_avg—g_range. If g_range is greater or equal to d_range, set map_d_nflr equal to d_nflr and set g_nflr equal to g_high_avg—d_range. (See block 1, FIG. 10). The variable map_d_nflr is used in the second stage as a lower limit on input dub values.

(d) Compute entries for the table that converts raw guide track values, now referred to as g_in, into output values according to the following function:

$$g\_to\_d\_map = \begin{cases} g\_in+(map\_d\_nflr-g\_nflr), & \text{if } g\_nflr < g\_ln \leq 100 \\ map\_d\_nflr, & \text{if } 1 \leq g\_in \leq g\_nflr \end{cases}$$

The expression (map_d_nflr−g_nflr) provides a constant range offset to compensate for the differences found between the top levels of the dub and guide signal ranges. (See block 72, FIG. 10).

7. Create a further lookup table for use in the third stage that maps input values of the normalized dynamic range found in step 6c into values v (where v=0,1,2 or 3) for use in weighting the spectral distance measures that will be computed in the third stage. In the third stage the weighting function is implemented by multiplying the raw spectral difference in one band by a function $2^{v(|)}$ where | is the input to the table found by taking the maximum of d_in and the mapped g_in. (See block 73, FIG. 10). The steps used to create the table of v(|) are as follows:

(a) Divide the minimum of g_range and d_range by n_div, which is a number of range division, and take the greatest integer value part of the result as the division increment, div_inc;

(b) For input values of | from 1 to 100, compute entries for the table of v(|) according to the following function:

$$v(|) = \begin{cases} 3 \cdot (d\_high\_avg-div\_inc) \leq | \leq 100 \\ 2 \cdot (d\_high\_avg-2*div\_inc) \leq | < (d\_high\_avg-div\_inc) \\ 1 \cdot (d\_high\_avg-3*div\_inc) \leq | < (d\_high\_avg-2*div\_inc) \\ 0 \cdot 1 \leq | < (d\_high\_avg-3*div\_inc) \end{cases}$$

The above procedure divides the common dynamic range into n_div steps and input values above and below this common range are mapped to the highest and lowest values of v, respectively. To obtain a greater (or lesser) range of weights, n_div may be increased (or decreased) and a function similar to that above may be used to obtain the new v(|).

The second and third stages of the Time Warping Processor (TWP) generating algorithm will be described next. Some of the most important variable and arry definitions are listed now.

| Variable | Definition |
|---|---|
| DSF | Dub start frame (number): used at start of second stage. |
| DSTOPF | Dub stop frame number. |
| NWDF | Number of working dub frames: defines the number of slots of dub frame data held in each dub-related array. |
| NDFR | Current number of dub frames read in and processed so far in second stage. Also indicates the number of j of the dub frame being processed in the second stage. |
| GSF | Guide track start frame number. (=1). |
| GSTOPF | Guide stop frame: initiates shutdown of TWP activity. |
| NCGF | Number of current guide frame being processed. |
| HPENSI | Horizontal DP step penalty for dub frames classed as silence. |
| HPENSP | Horizontal DP step penalty for dub frames classed as speech. |
| LDPNSI | Lower Diagonal DP step penalty for dub silent frames. |
| LDPNSP | Lower Diagonal DP step penalty for dub speech frames. |
| TH | Threshold used in pruning DP scores. |
| MAXRPT | Maximum number of frames of horizontal path growth allowed before silence pruning is attempted. |
| PE | Path end column in path array. |
| PSTART | Path start column in path array. |
| Array Dimension | |
| MNDF | Maximum number of dub frames held in arrays. Typically MNDF = 50 |
| NPAR | Number of parameter vector elements used. |
| MXPATH | Maximum length of path segment held in path array. |
| Array | |
| DCLASS(MNDF) | Dub classifications (speech or silence). |
| DFRNUM(MNDF) | Dub frame numbers corresponding to j's. |
| DIST(MNDF) | Spectral distances between each dub frame parameter vector in DSTORE and current guide parameter vector. |
| DSTORE(NPAR,MNDF) | Dub parameter vector working store holding NPAR elements per dub frame. |
| HPEN(MNDF) | Horizontal penalties to be used in DP steps. |
| LDPEN(MNDF) | Lower diagonal penalties to be used in |

| Variable | Definition |
|---|---|
| | DP steps. |
| HSU(MNDF) | Horizontal DP step-used-in-speech flags. |
| PATH(MXPATH,MNDF) | Best partial path up to each end point. |
| SCORE(MNDF) | Accumulated score for each partial path. |

In FIG. 14 the activities of the three processing stages are illustrated in relation to each other in a flow diagram of the entire time warping process, in which the first, second and third stages I, II, and III are represented by blocks 75, 76, 77 and 78. Before FIG. 14 is described, the method of processing guide track and dub filter bank outputs is explained. In the following explanation it should be noted that guide and dub filterbank output values are readily and continuously available from a buffer memory, and that at the end of the guide signal parameterization, the variable GSTOPF will be set to the last guide frame number. The signal which initiates the setting of GSTOPF is derived by means discussed later. Before the algorithm is started, GSTOPF is initialized to some arbitrarily large value never to be reached in operation. In addition, to enable the system to handle properly a replacement signal whose duration extends beyond that of the reference signal, the parameterization and storage of the dub signal should continue for a duration sufficiently long to contain a signal ending which substantially resembles the (possibly earlier) signal ending in the reference signal. This safety measure can be accomplished for example by deriving a further variable, DSTOPF, by adding a fixed number of frames (e.g. 200 or two seconds of frames) to GSTOPF when GSTOPF becomes known, and then allowing the dub processing to continue up to the moment in time corresponding to the end of this frame. The variable GSTOPF is used to end processing activity of the second and third stages II and III, whereas DSTOPF is used to terminate the input and parameterizing of the replacement signal, and to mark the end of available replacement data during the processing.

The use of circular arrays is implied in all further discussions, but this is not necessary for very short signals.

Before any of the processing represented by FIG. 14 begins, the user may select (or adjust) the values of the DP step penalties (HPENSI, HPENSP, LDPNSI, LDPNSP), the pruning threshold (TH), and dub silence frame repeat count threshold (MAXRPT). These values are generally determined experimentally and are dependent on the output range of the parameter vector generating processes and frame rates.

At a given signal (generated upon loop entry), the parameter generator processor is started (block 79). Once a sufficient number of raw guide and dub parameter vectors are available (decision 80), STAGE I (block 75) is enabled and produces the threshold variables, and mapping and weighting function arrays described hereinbefore. STAGE II (block 76) is then used to preload the arrays as shown in FIG. 11 up to their maximum length or to the last dub frame, whichever is smaller. Next, STAGE III is initialized at A by resetting all relevant counters and clearing or setting array elements. Finally the main processing loop is entered and repeated for each guide frame. In each pass through this loop a STAGE II load (block 77) is attempted (but may not be made if the oldest slot in the dub arrays still contains a potential path candidate). Also in this loop, STAGE III processing (block 78) takes place in which parallel DP steps are made for each active path, and also an attempt is made to output a unique best path or a segment of silence. When the last guide frame is processed, the remaining path segment with the best score is output, and the time warping process is finished.

The second stage of the time warping process is represented in detail in block form in FIG. 11 and in a flow diagram in FIG. 15. This stage pre-processes the dub filterbank outputs and loads time-varying data into arrays for use in the DP step which takes place in the third stage. Decisions and processing affecting how the data is prepared are partly based on some of the long-term data derived in the first stage.

The relationships between the input dub filterbank data and the data loaded into the arrays DSTORE, DCLASS, LDPEN, HPEN, and DFRNUM are shown functionally in FIG. 11. The arrays (of dimension NWDF) are treated circularly and are loaded at the same array row index once for each dub frame classified as speech, or once every other frame when consecutive dub frames are classified as silence. The classification of the dub frame (taking place in the block 79 inscribed CLASSIFY: SPEECH/SILENCE) is based upon a simple decision algorithm whereby if any two out of the four raw input dub bands are above the respective thresholds for those bands (set in the first stage, i.e. d__sp__thr), the frame is classified as containing speech. Otherwise it is classified as silence. In the block 80 inscribed CLIP LOWER RANGE, each band of the raw dub filterbank values is compared with the corresponding mapped noise floor (map__d__nflr determined in the first stage) for that band. If the raw value of the band falls below the map__d__nflr of the band the raw input value is replaced by map__d__nflr which is loaded into the appropriate slot in DSTORE. Any dub band value above the corresponding map__d__nflr is loaded without modification into DSTORE. This step is part of the total operation which eliminates the possibility of noise masking, and equalises the guide and dub band dynamic ranges.

In a block 81 inscribed SELECT LD-PENALTY and HZ-PENALTY, the user-input values for the penalties to be added for non-diagonal DP steps (in the third stage) are selected, based upon whether the corresponding frame is speech or silence. By using very small penalties for silence frames as compared with the penalties for speech frames, the path will be much more flexible during dub silence, which is a desirable effect. The lower diagonal penalty is made slightly negative so that best paths in dub silence can be biased towards a slope of 4:1 during low level guide signals, which is useful for compressing long gaps in the dub when necessary.

Another block 82 inscribed INCREMENT DUB FRAME COUNT is shown which produces the appropriate frame numbers to be loaded into the array DFRNUM for later use in producing the correct time warping path steps in the third stage.

Finally, a block 83 inscribed SELECT SAMPLING RATE increases the sampling rate of the dub frame data (via a block 84 inscribed SAMPLE AND INCREMENT INDEX) when the current and previous dub frames are classified as silence. Otherwise the sampling rate remains 1:1. The particular algorithms used to implement these functional blocks are illustrated in the flow diagram of FIG. 15 and include decisions 91, 92, 93 and 94 operating on dub class DCL, next dub class NXTCLS, and previous dub class PRVCLS. Before this stage is used, the variable NXTCLS is initialised to UNKNOWN, and PRVCLS to SPEECH.

Details of the Third Stage

In the third stage of the time warping process, a Dynamic Programming (DP) algorithm is used with window steering and path pruning based on that of the ZIP algorithm, along with an added horizontal path step restriction and a silence pruning operation, to produce a best time warping path and corresponding frame classifications for input to the signal editing process. FIG. 12 illustrates the major processing operations and their relationship to the data structures defined previously. FIG. 16 summarizes the primary operations in flow diagram form. These operations are performed sequentially, and begin (see FIG. 14) after the required number of dub frames have been processed in the first and second stages.

During the second stage, the array DSTORE is filled with processed dub parameter vectors that may have been reduced in their dynamic range by the range normalization operation in the second stage. The dub parameter vectors in DSTORE are not necessarily strictly consecutive, owing to the possibility that the sampling rate may have been increased. However, for each dub frame parameter vector in DSTORE the appropriate penalties to be used in the DP step and the classification and dub frame number to be used in updating the paths are held in the arrays LDPEN, HPEN, DCLASS, and DFRNUM respectively. All elements of the PATH array are generally initialized to 0, and the upper half of the SCORE array is given a rejection code while the lower half is set to a zero score. The rejection code is used to identify elements which need not be further processed. Additionally, all elements of the array HSU are set to logical false.

The array HSU is used to introduce a restriction on the number of consecutive horizontal steps allowed along any path with frames classified as speech. Referring to FIG. 8 and the DP step equation, the a=0 step is allowed to be used once only for any frame that is classified as speech. In this way a minimum path slope of $\frac{1}{2}$ (i.e. an expansion factor of 2) is permitted during speech.

As illustrated in FIG. 12 and FIG. 16, the following operations are executed once for each pass through the processing loop shown in FIG. 14 (i.e. once per guide frame).

1. Update the path end pointer PE (block 95, FIG. 16).
2. Get the next raw guide parameter vector from the buffer and map each component through the corresponding g—to—d—maps. This is carried out in a block 85 inscribed RANGE NORMALIZE AND LIMIT.
3. Compute the weighted spectral distance measure between the normalized guide frame parameter vector and each dub frame parameter vector in DSTORE that is required in the exploration window in the next set of parallel DP steps. These distances are put into the corresponding slots in DIST. This operation takes place in the block 86 inscribed COMPUTE WEIGHTED SPECTRAL DISTANCE.
4. For each active score and path in the current search window, compute the DP step using horizontal step restrictions, penalties, scores and distances at the appropriate indices of the arrays HSU, LDPEN, HPEN, SCORE and DIST respectively, to find the path element producing the best score. Update the path end in the PATH array at PE with the corresponding dub frame numbers (from DFRNUM) and the SCORE array with the best scores. In addition, mark the path element with the classification of the dub frame. Set or clear any horizontal path restrictions as appropriate. These operations all take place in a process block 87 inscribed DP STEP.
5. Prune (i.e. reject) paths with scores more than the threshold value (TH) away from the best score in SCORE, and put a rejection code in each element of SCORE that has been pruned. The remaining (unrejected) scores define the search window that will be used to extend the paths in the next DP step. This operation takes place in a block 88 inscribed PRUNE BAD SCORES & CORRESPONDING PATHS.
6. If the paths remaining in PATH trace back to (i.e. agree on) a common path segment, output that path (and corresponding speech/silence markers in the path) up to the point of divergence of the path, and clear the common path elements from PATH. This takes place in the block 89 inscribed DETECT AND OUTPUT UNIQUE PATH ELEMENTS.
7. If the classified path segments remaining in PATH indicate that the exploration window has been passing through a region of dub silence and relatively featureless region of the guide frames for more than MAXRPT frames, output the best scoring path (and corresponding classifications) up to the last element, remove all other paths, and restart the DP algorithm at the remaining path end element. This operation is carried out in the block 90 inscribed DETECT AND OUTPUT PATH SEGMENT IN DUB SILENCE.
8. If the last guide frame has been processed (indicated by GSTOPF), find the remaining path segment with the best score and output it. (This step is not shown in FIG. 12). This action terminates the time warping process.

For the preceding operation number 3, the process for computing the weighted spectral distances, the spectral distance weighting factor (introduced previously) is defined in spectral band i as $$r_i(kT) = 2^{v_i(l_i)}$$

in guide frame k, where $|_i$ is the maximum of the ith mapped guide band value and the ith normalized dub band value from DSTORE. The resultant value of $|_i$ is used as an index to the array of weighting values $v_i(|_i)$ for band i and a power-of-two weighting of the absolute values of the difference between the ith dub and guide bands is computed to obtain the contribution of the ith component to the total spectral distance.

The additional data path leading to this process block from the score array allows sensing of rejection codes marking elements that have been rejected or are not active in the current search window, so that unnecessary distance calculations can be prevented from being carried out.

The operation number 6 can be implemented simply as follows. First, the columns of PATH which contain the first and last elements of the remaining path segments must be located. Call the index of the column containing the start of the current path segments, PSTART, and the column which contains the end elements of the current path segments, PE. Given a total number of columns in the path array of MXPATH, employ the following algorithm, which is presented in a pseudo-programming language for convenience. Note: £ indicates a comment, and questions and their corresponding answers (i.e. Yes and No) are equally indented.

```
i = PSTART           £ set column pointer index i
1 Is the same element in all remaining paths at i?
  Yes:               £ Path is unique in this column.
  Output path element and classification.
  Mark all entries in column i with output/rejected
  code = 0.
  i = i + 1.
  If (i MXPATH) set i = 1.
  If (i not equal PE) go to 1.
  Go to 2.
  No:                £ Paths diverge in this column
  Has anything been output (i not equal PSTART)?
    No:
    Is the path array full?
      Yes:
      Output the oldest path element with the best score.
      Remove paths disagreeing with element
      that was output.
      Put rejection code in score assay for removed paths.
      i = i + 1.
      if (i MXPATH) i = 1.
      Go to 2
      No:
      Go to 2
    Yes:
    Go to 2
2 PSTART = i         £ Take current column (with
  Return.            £ possible path divergence) as
                     £ new PSTART for next pass.
```

The operation number 7 appears to be unique to this implementation and will now be described in some detail. The reason for including this operation arises from a consideration of the DP path production steps used, and will be explained with reference to FIG. 17, which is a schematic representation of typical contents of the path array after the DP algorithm has stepped through several frames of low level guide signal (at or near the guide noise floor) and the corresponding dub frames have been classified as silence. The fact that the guide frames are at low levels means that the spectral distance measures between the guide and silence dub frames will be very low or 0, and thus give rise to a lack of features in the incoming distance measures and scores which would otherwise normally provide sensible window steering.

The positions of the dub frames which are stored in DSTORE are indicated on the vertical axis of FIG. 17 by dots, and it is seen that dub frames at alternate j values are used during silence. The paths produced during the DP steps in silence generally have a slope of 4:1 due to the bias of the DP step towards the lower diagonal during frames of dub silence. However, during these steps, the scores for each path are either decreasing or increasing very little (because of the low penalties used), in order to allow silent regions to have very flexible paths. Consequently the scores of the worst scoring paths will only be increasing marginally and thus these paths will not generally be pruned by the fixed threshold pruning operation during dub silence. The number of paths will increase at a rate of two per guide frame and thus introduce a heavy and unnecessary computational burden unless removed. Accompanying this lack of pruning in dub silence are the facts that 1) the lowest path (e.g. from d to e in FIG. 17) usually has a growing number of repeated frames and 2) the fastest rising path (e.g. from a to c in FIG. 17) has a slope of nearly 4:1 for the section of the path corresponding to the repeated frames in the lowest path (i.e. from b to c in FIG. 17). These facts result in a triangular path beam characteristic of the shape of path exploration during dub silence with the classification-dependent DP algorithm implemented.

Because some of the penalties are negative, the best score does not necessarily indicate the optimal path but is likely to do so. Most importantly, the path taken through this region is generally arbitrary so long as the spectral distance measures do not indicate that speech has been encountered at points such as c or e in FIG. 17 which would be manifested in score changes sufficiently large to activate the pruning and window steering described previously.

Although it is not certain where the optimal path will be required to go in the next step (at PE+1) there is nonetheless a best choice of path to be made in view of the properties of the current DP algorithm. Generally, the best path to take is the one which has the best score. However if the procedure described hereinafter is implemented, the path with the best score will be the fastest rising path in most cases. From the example of FIG. 17 it can be seen that if the next guide frame to cause a path extension at PE+1 were speech, and if the next dub frame after c were the speech frame corresponding to the next guide frame, the highest path shown would have compressed a gap of silence nearly four times longer than that in the guide. Alternatively, if the dub and guide spectra continued to be featureless, there would be no loss in exploration ability from abandoning all paths but this highest one and restarting the DP algorithm from point c since the DP algorithm will continue to explore simultaneously paths which repeat the dub frame at c and paths rising at a rate of 4:1 from c. This procedure therefore can effectively find a path through any dub silence gap of $t_g$ in duration and fit it to a corresponding gap in the guide track of any duration from $t_g/4$ to infinity.

The technique and algorithm used to detect and output dub silence in the conditions described above will now be described. Defining the number of repeated frames back from PE along the lowest path (not counting the first one as a repeat) as RPTCNT, then the maximum number of vertical dub frame steps that could be taken if the highest path were stepping through a region of dub silence is RPTCNT multiplied by 4. However, it is not expected that every step will necessarily be a 4:1 step, and it is better to define a rise of a threshold number of dub frame units of j based on an average slope less than 4:1 that allows a few smaller steps to be included in the fastest rising path and also still allows the maximum rise to be an indicator of a dub silence region. We have found that an average slope of 3.4:1 is a reasonable indicator that the path is rising through silence. The algorithm which follows is again described in a pseudo programming language.

Count the number of repeated elements in the lowest path in PATH back from PE.
Take this number as RPTCNT.

```
Is (RPTCNT > MAXRPT) ?    £ Has a sufficiently long gap
                          £ been explored?
No:
Return.
Yes:
Calculate a minimum number of frames (MNFRMS) that
the path would rise in RPTCNT frames if the upper
```

-continued

```
path was not finding any significant features.
MNFRMS = 3.4 * RPTCNT.
Calculate the actual span NSPAN in frames in the upper
path between the dub frame number at PE and the
dub frame at PE − RPTCNT.
Is (NSPAN > MNFRMS) ?
Yes:
£ The the area explored has been featureless
Find the best score and output hte corresponding
path up to but not including the element at PE.
Clear all path elements but the end of the best path
at PE.
Put the rejection code in all SCORE elements but
the best.
Return.
No:
Return
```

DUB EDITING PROCESSOR

The purpose of the processing block 49 inscribed GENERATE EDITING DATA in FIG. 6 is to use the time warping path and corresponding speech/silence classifications of the path elements as gross instructions for editing the dub waveform which is stored on the disc, and to also derive exact editing instructions (when required) from pitch period data and dub waveform details. The final editing of the waveform is carried out in the process block 51 inscribed EDIT WAVEFORM, which simply fetches the signal in segments defined by the editing data, and pieces together an edited dub waveform which has the following properties: (1) For every frame of the time warping path, approximately a frame-length segment of the dub waveform in the region of time indicated by the warping path is output: (2) For each frame classified as silence in the warping path, a frame-length period of true (digital zero) silence may be output to replace the dub waveform: (3) deletions or repetitions of dub waveform frames (as specified by the time warping path) are carried out pitch-synchronously in voiced speech—that is, the deleted or repeated waveform segment is the integral number of pitch periods in length which best satisifies the requirements of the warp path and last output sample loaded: and (4) endpoints of any non-adjacent waveform segments that are joined together are matched to eliminate any perceived discontinuities.

Examples of the operations referred to hereinbefore at (1) and (2) in the preceding paragraph are represented in FIG. 18. For every guide frame k there is a dub frame j=w(kT). In FIG. 18 a path w(kT) is shown in the (k,j) plane as a series of connected dots which if open indicate that the dub frame has a silence classification and if calcalated as: (e.g. a speech frame can be repeated once only, and no more than one speech frame can be skipped in any one step); this simplifies the editing process considerably. Adjacent to the j axis a typical dub time waveform, $x_2(t')$, is represented graphically with each dub frame number j aligned at the end of a frame period of T seconds, thereby fixing the correspondence of the waveform segments to the frame numbers. At points in the path w(kT) where frames of j are skipped, an "X" marks a waveform section for deletion. Similarly, double arrows mark a segment for repetition.

The dub waveform segments are projected down to the time axis t'' adjacent to the k axis (as typified by the segment marked out by broken lines) to reconstruct graphically (ignoring any discontinuities) an edited $x_2(t')$, which is labelled $\hat{x}_2(t'')$, from the selected waveform segments and from digital silence (i.e. zeros). The discontinuities which would result from such a reconstruction would be perceptually unacceptable. Therefore, the following technique alleviates this problem and still maintains a close tracking of the time warping path as primary editing data.

The following quantities are defined for use in describing the editing process:

Constants:
SMPRAT—The sampling rate of the stored dub waveform.
LENFRM—The length of a frame of waveform in samples.
ETIS—The edit threshold in samples (=LENFRM/2)

Frame Rate Variables:
NG—(Current) guide frame number (corresponding to k).
ND—(Current) dub frame number (corresponding to j) obtained from warp path in frame NG.
DCL—Dub frame ND's classification.
PRVND—Previous dub frame number from warp path at NG-1.
PRVDCL—Previous dub frame PRVND's classification.

Sample Rate Variables:
TESIIW—Target end sample in input (unedited dub) waveform.
LESIIW—Load end sample in input waveform.
TESIOW—Target end sample in output (edited dub) waveform.
LESIOW—Load end sample in output waveform.
INCSMP—Increment in samples from previous to current input waveform targets.
DEV—Deviation in samples between the output waveform end sample and target end sample that will result if the next frame is loaded with length LENFRM after the current LESIOW.

The basic operations involved in editing are shown in the form of a flow diagram in FIG. 20(a), (b) and (c).

As seen from the example of FIG. 18, the time warping path w(kT) defines two sets of target endpoints in samples of waveform segments LENFRM=T*SMPRAT samples in length. (See also FIG. 20(a)). The first of these is the target endpoint sample number in the output (edited) waveform, where a segment at guide frame NG (=k) is to end. Thus, if signals begin at sample one, the kth frame number specififes that the end of the kth segment, LENFRM samples long, would be at sample number k* LENFRM in the output waveform. For a particular frame k, the target endpoint sample in output waveform is referred to as TESIOW. Similarly, the dub frame number ND=j, obtained from the warp path as j=w(kT), also specifies an input (unedited) waveform segment endpoint at sample number j*LENFRM. For a particular frame of j, the target end sample in input waveform is referred to as TESIIW.

If the editing process were to simply produce an output waveform as exemplified in FIG. 18, the difference (TESIIW−TESIOW) would be unlikely to equal 0 for any frame. Therefore the editing process is designed to attempt to fetch consecutive segments of the input waveform until the deviation between the actual endpoints and target endpoints in the output and input waveforms would become greater than some predefined threshold value. The editing process can then load segments which do not necessarily end on segment boundaries defined by the sequence of TESIIWs and concatenate these segments to form an output waveform in which the end samples in each load segment do not necessarily fall on segment boundaries defined by the sequence of TESIOWs. To compute this running deviation, two further variables must be introduced.

The first, LESIOW, of these further two variables refers to the actual last load end sample in output waveform, and is the sample number found at the end of the last loaded segment, counting from the first sample inclusive, of the output signal. Similarly, the second, LESIIW, refers to the load end sample in the input waveform and is the number of the sample last loaded into the output waveform signal buffer, counting from the first input sample inclusive.

With these four variables TESIOW, TESIIW, LESIOW and LESIIW it is possible to find the deviation from the "target" waveform defined by w(kT) that would exist after any input waveform segment is loaded into any location in the output waveform. This deviation, defined as DEV is calculated as:

DEV=TESIIW−TESIOW+LESIOW−LESIIW, as indicated in block 96 of FIG. 20(b), and provides a number (in samples) which is positive if the last loaded waveform end sample is beyond its targeted position in the output buffer. Similarly, DEV is negative if the last loaded waveform end sample falls short of its targeted position in the output buffer. Given that the deviation can change each k if w(k)=w(k+1)−1, the output waveform is assembled frame by frame, and the deviation is computed before each new segment is loaded. If the magnitude of the deviation that would result from loading the next LENFRM samples after LESIIW into the position in the output waveform following LESIOW is greater than a maximum permissible deviation defined as ETIS (edit threshold in samples), an editing operation is applied, as illustrated by FIG. 20(c) following a YES answer to a decision 97 in FIG. 20(b).

In segments of dub waveform classified as speech the editing operations must be done pitch synchronously if the segment is found to contain voiced speech, and the required operations are described below. With reference to the example in FIG. 19, the input waveform (unedited dub) shown at (a) represents periodic speech on an axis numbered in samples every LENFRM=100. In FIG. 19 at (b) the target end samples are shown, and a typical skip of 100 to 300 is indicated for TESIIW, whereas TESIOW does not (and cannot) make this jump. If the deviation for the first load is tested using LESIIW=100 and LESIOW=100, then DEV=0. Therefore, no editing is required and this segment is loaded into the output buffer as shown at (c) in FIG. 19. However, in the second frame, if a load were made with LESIIW=200, then with TESIIW=300, TESIOW=200 and LESIOW=200, DEV=100, which indicates a skip must be made to reduce DEV below the threshold of TH=50.

The general procedure taken to make this edit is as follows:

(1) The next three frames following the current LESIIW (at sample q in (a) of FIG. 19) are loaded into the output buffer after LESIOW (at q') for examination. (See block 8, FIG. 20(c)). This extra segment in the example is from point s to point u in the input buffer and is shown loaded in the output buffer from s' to u'.

(2) The period of the waveform over the current and next frame is measured using the waveform in the output buffer, and the result (in samples) is assigned to the variable PERIOD. (See block 99 in FIG. 20(c)). The computational method used to find the period is that of the Average Magnitude Difference Function (or AMDF), which is described in detail along with several other equally useful techniques in Chapter 4 of "Digital Signal Processing of Speech Signals" by L. Rabiner and R. Schafer, referred to hereinbefore.

(3) The optimum number of integral waveform periods in samples, NPOPT, is found such that the expression |DEV−NPOPT| is minimized. (See block 100, FIG. 20(c)). This will be taken as the ideal number of samples that should be skipped (i.e. edited out). (Note: if DEV 0, NPOPT will also be a negative number, indicating the optimum number of period that should be repeated).

(4) Find the zerocrossing point nearest to LESIOW and mark this point as ZCR1 as shown at (d) in FIG. 19 and block 101, FIG. 20(c).

(5) From this point, search either "side" of the sample located at (NPOPT+ZCR1) in the temporarily loaded waveform for the zerocrossing which matches the direction of that found at ZCR1. The point at which this second zerocrossing is found is marked as ZCR2. In the example shown, this point is found at a sample approximately one pitch period away from ZCR1 (Block 102, FIG. 20(c)).

(6) The segment comprising LENFRM samples following ZCR2 (i.e. from ZCR2+1 to y') is transferred in the output buffer such that it starts at the sample at ZCR1+1 (thus overwriting the temporary data) as shown at (e) in FIG. 19 and block 103, FIG. 20(c). This completes the pitch synchronous editing operation needed.

The sample number at y' is then taken as the current LESIIW and the corresponding sample, y, in the input signal is taken as the current LESIIW for that frame (see block 104, FIG. 20(c)). Following the load just described, the next load tested in the example will reveal that |DEV| ETIS, and consequently the next LENFRM samples following y in the input waveform (i.e. to z) can be loaded into the output buffer following y' (i.e. to z') with no editing, as shown at (a) and (e) in FIG. 19 respectively.

The preceding procedure also succeeds if DEV O, if NPOPT is allowed to take on negative values, thereby indicating that the search for ZCR2 will be made around the sample (ZCR1+NPOPT) (i.e. to the left of ZCR1) for a segment which will start at ZCR2 and be repeated after the sample at ZCR1.

The process of testing DEV each frame continues for the entire time warping path. However, special action must be taken when the measurement of signal period reveals that the segment under scrutiny is unvoiced. (See decision 105, FIG. 20(c)). Then this situation occurs, NPOPT, the number of samples to be skipped (or repeated) is set to equal DEV, and then the procedure described above is followed from step (4). Lastly, a further operational difference takes place when the segment to be output is classified as silence. In this case, because digital silence (i.e. a frame of zeros) is used to replace the input waveform, LESIIW may be incremented by the difference in samples between the previous TESIIW and the current TESIIW, thus keeping the deviation constant. This is shown at blocks 106 and 107 of FIG. 20(c) which follows decisions 108 and 109 of FIG. 20(b).

A flow diagram of the entire editing process is given in FIG. 20. A feature included, (not previously mentioned) is a "look ahead" test in which if the deviation calculated for a frame indicates that an edit is required, decision 110 of FIG. 20(b), the deviation for the next frame is calculated and, if the deviation in the next frame (with no editing being done in the current frame) is within the edit threshold, decision 97, then no editing action will take place in the current frame.

Several simple modifications can be made to the preceding basic operations which reduce the chances of discontinuities at speech-to-silence and silence-to-speech frame boundaries. For example if a speech frame j precedes a frame j+1 classified as silence, then the actual signal content of the frame j+1 can be output in place of digital silence and a scan backwards through the waveform in frame j+1 can be made to locate the first zero crossing location. Then all points from this location to the end of the frame j+1 can be set to digital zero. Alternatively, a simple linear crossfade to zero can be introduced at the end of frame j (or, if used, j+1). Similarly, if silence is followed by speech at frame j, frame j−1 can be output in place of silence, and a zeroing of the waveform from the beginning of frame (j−1) to the first zerocrossing (or a linear crossfade) may again be carried out.

Although in the preceding description an output waveform is produced on a frame-by-frame basis according to the results of computing the deviation DEV at each frame, it is also possible to build up a table of pointers to samples in the input waveform from the editing data, and these pointers may be saved in system memory or on disc. The pointers can be used to indicate the start and end sanples of segments to be fetched during a playback operation and also indicate the position and duration of segments of digital silence to be output. Thus a list of editing instructions is produced rather than a new waveform, and considerable disc space may be saved with no operational disadvantages.

The processing operations as described hereinbefore with reference to FIG. 6 are coordinated and/or are carried out using software which operates in the hardware shown in FIG. 2 as follows.

The separate procedures for Operator Interfacing, System Control, and Signal Editing are originally written in RATFOR (Rational FORTRAN) language, and are translated by a RATFOR preprocessor to produce ANSII FORTRAN-77 code. This source code is compiled by the Intel FORTRAN-86 compiler to produce individual program units in the form of relocateable object code. These program units, together with appropriate device drivers, input/output system, and operating system nucleus are then configured into a loadable system of tasks using the Intel RMX-88 Interactive Configuaration Utility. This system contains the appropriate software to support a Real-Time Multitasking Environment in which the application tasks and operating system can run and it may be loaded into the Random Access Memory (RAM) on SBC1 (from a disc file for example) and executed. When running, the task priorities are arranged so that the operator communication, Magnatech signal sensing and control, signal digitization and storage on disc, signal editing, and communication with SBC2 all appear to take place concurrently.

More specifically, these procedures are handled either by Interrupt Service Routines (ISR), which respond immediately to real-time events, such as a signal received on an interrupt line, and thus quickly service specific external events; or by Interrupt Tasks which exchange the activities of the processor for more complex sets of responses. The processes on SBC1 start upon receipt of the Master Record (On) signal from the MTE 152 processor 15 and are thus grouped together in an interrupt task. Amongst the start up procedures are: start the time warping processor via a memory-mapped flag between SBC1 and SBC2, enable the A/D-C buffer hardware interrupt, enable the termination procedure on Master Record (Off), and start the Editing Processor. The Editing Processor (also on SBC1) runs as part of the same task, but examines pointers on SBC2 via memory mapping to ascertain if data is available for processing, and also sets pointers in the memory of SBC2 to stop unprocessed data being overwritten.

The transfer of data from the A/D-C buffer memory to the disc is handled by an Interrupt Task which responds to the A/D-C Buffer Full hardware interrupt signal and passes the appropriate memory and disc addresses to the disc controller which in turn activates and supervises the data transfer by means of Direct Memory Access without further processor intervention.

The termination procedure is initiated on deactivation of the Master Record signal, and again memory-mapped pointers and i/o port handshakes support interboard communication during this stage.

The Time Warping Processor (TWP) on SBC2 is written in RATFOR, preprocessed, compiled and configured into a simpler, single task module, loadable from disc into the RAM on SBC2. Once the task on this board has been started, it waits to receive an interrupt from SBC1 via an i/o port to start the TWP. After the TWP has begun, the Parameter Buffer Full hardware interrupt is enabled, and emptying these buffers into the on-board memory of SBC2 is done via an ISR. The time warping path is passed to SBC1 via the memory mapping as explained above, and the TWP termination signals are passed via i/o interrupts and memory-mapped flags.

FIG. 21 is a block diagram in more detail of the analog-to-digital and digital-to-analog units 28 and 29 of FIGS. 2 and 3, and reference numerals used in FIG. 3 are applied in FIG. 21 to their corresponding elements. FIG. 21 shows the control 32 of FIG. 3 to include a clock generator 111, which runs at 12.288 megahertz. The units 28 and 29 also include a loop and mute logic which allows the digitized signal from the microphone 11 to be routed to the digital-to-analog unit 29 if required. The coupling of the microphone input to the dub parameter extraction processor 42 of FIG. 2 is also indicated in FIG. 21, the microphone input passing through a channel designated CHANNEL A AUDIO in FIG. 21 to a filterbank (not shown) in the form of an MS2003 digital filter and detector (FAD) manufactured by The Plessey Company p.l.c. of England under licence from British Telecom and described in Plessey Data Sheet Publication No. P.S. 2246 issued by Plessey Research (Caswell) Limited, Allen Clark Research Centre, Caswell, Towcester, Northants, England. The CHANNEL B AUDIO indicated in FIG. 21 is the channel to the guide track parameter extraction processor 43 of FIGS. 2 and 4. A second MS2003 digital filter and detector, FAD2, constitutes the digital filterbank 57 shown in FIG. 4. channels A and B have respective buffers as final stages shown in FIG. 21, and the outputs from these buffers are differential, this being indicated by double lines from the buffer stages, as in the case of the audio output buffer 41. Interconnection in the control circuitry and from elements of the control circuitry to the controlled units are simple or complex buses. The large buffer 30 of FIG. 3 is arranged as two memory banks A and B having common data and address multiplexers.

In each of the parameter extraction processors 42 and 43, the processes carried out by each block inscribed LOG are, in this example, the addressing and outputting from a look-up table in a PROM (programmable read-only memory). The switches 58 may be a multiplexer.

Further accounts of prior art time warping and word recognition are given by L. R. Rabiner and S. E. Levinson in an article entitled "Isolated and Connected Word Recognition—Theory and Selected Applications" at pages 621 to 659 of the IEEE Transactions on Communications, Vol. COM-29, No. 5, May 1981.

We claim:

1. A method for use in editing speech, the method being characterised by the following steps:
producing digital data representative of a second speech signal which is substantially imitative of a first speech signal;
processing the said signals to determine therefrom the occurrence and/or value of selected time-varying parameters of the first and second signals;
generating digital data representative of presence and absence of speech in the second signal, in response to processed digital data representative of the occurrence and/or value of selected time-varying parameters in the secocd signal;
generating digital data representative of pitch in the second signal;
utilizing the sequences of digital data representative of presence and absence of speech in the second signal and representative of time-varying parameters of the first and second speech signals to generate digital data representative of difference between the timing of characteristic features of the second speech signal and the timing of the corresponding characteristic features of the first speech signal; and
processing the digital data representative of pitch and the said difference in timing and the sequence of digital data representative of presence and absence of speech in the second speech signal and the said digital data corresponding to the second speech signal so as to generate editing data in accordance with a requirement to substantially replicate with the said characteristic features of the second speech signal the timing of the corresponding characteristic features of the first speech signal by adjusting the durations of silence and/or speech in the second speech signal.

2. A method according to claim 1, characterised by the step of editing the digital data corresponding to the second speech signal in accordance with the editing data and generating thereby edited digital data corresponding to an edited version of the second speech signal.

3. A digital audio system characterised by means (25) for storing digital data corresponding to a second speech signal which is substantially imitative of a first speech signal;
means (42,43) for determining from the first and second speech signals the occurrence and/or value of selected time-varying parameters of the first and second signals;
means (SBC1, 48) for generating digital data encoding characteristic acoustic classifications in response to processed digital data representative of the occurrence and/or value of selected time-varying parameters of the second signal;
means (SBC1, 50) for generating the digital data representative of pitch in the second signal;
means (SBC2) for utilizing the sequences of digital data encoding the said characteristic classifications and representative of time-varying parameters of the first and second speech signals to generate digital data representative of difference between the timing of characteristic features of the second speech signal and the timing of the corresponding characteristic features of the first speech signal;
means (SBC1) for processing the digital data representative of pitch and the said difference in timing and the sequence of digital data encoding characteristic classifications of the second speech signal and the said digital data corresponding to the second speech signal so as to generate editing data in accordance with a requirement to substantially replicate with the features of the second speech signal the timing of the corresponding characteristic features of the first speech signal by adjusting the durations of silence and/or speech in the second speech signal.

4. A digital audio system according to claim 3, characterised in that means (SBC1, 51) are provided for editing the digital data corresponding to the second signal in accordance with the editing data and generating thereby edited digital data corresponding to an edited version of the second speech signal.

5. A method of processinga replacement for an unsatisfactory recorded reference signal $x_1(t)$ containing a signal of interest $s_1(t)$ with significant time-dependent features, characterised in that
a replacement signal $x_2(t')$ that contains a signal of interest $s_2(t')$ with substantially the same sequence of time-dependent features as $s_1(t)$ but whose features occur with only roughly the same timing as the corresponding features of $s_1(t)$ is provided;
selected physical aspects of the signals $x_1(t)$ and $x_2(t')$ are periodically measured and from these measurements values of time-dependent parameters are determined, the measurements being carried out at a sufficiently high rate for significant changes in the characteristics of the signals $x_1(t)$ and $x_2(t')$ to be detected;
successive segments of the replacement signal are classified from the sequencc of some or all of the parameters so as to produce time-dependent classifications referring to presence and absence of a signal of interest $s_2(t')$ over the measurement period;
the time-dependent classifications and the time-dependent parameters ofthe signal $x_1(t)$ and $x_2(t')$ are utilized to produce a function that describes the distortion of the time scale of the replacement signal $x_2(t')$, that must take place to give the best alignment in time of the time-dependent parameters of the replacement signal with the corresponding time-dependent parameters of the reference signal;
the time scale distortion function is analysed to detect the presence of sufficient discrepancies between the reference and replacement signals' timing to warrant alterations being made to the time waveform of the replacement signal to achieve the desired alignment of significant features occurring on the time scale of the replacement signal with the corresponding significant features on the time scale of the reference signal;
the information obtained from this analysis of the time-scale distortion is utilized with information on the time-dependent classifications of and waveform of, and possibly fundamental frequency data of, the replacement signal to generate detailed control information for an editing process which is to operate on the replacement signal.

6. A method according to claim 5, characterised in that the said control information is used in the editing process to determine the deletion and/or insertion of appropriate sequences of signal data from or into the replacement signal so as to substantially replicate the timing of the significant relative time-dependent features of the reference signal in the edited signal.

7. A method of processing signals, the method being characterised by the steps of:

producing first signal feature data related to selected time-dependent features of a first signal and second signal feature data related to the same time-dependent features of a second signal which substantially resembles the first signal;

utilizing the said first and second signal feature data so as to produce timing difference data representative of difference between the timing of features of the second signal and the timing of corresponding features of the first signal;

producing second signal waveform data from which the waveform of the second signal can be reproduced; and utilizing the timing difference data to generate editing data determining which portions of the second signal waveform data are to be deleted and/or repeated in order to produce from the second signal waveform data further data from which there can be produced a waveform which substantially replicates the relative timing of the said features of the first signal.

8. A method according to claim 7, characterised by the steps of deleting and/or repeating portions of the second signal waveform data, in accordance with the editing data.

9. Signal processing apparatus characterised by means for producing respectively from a first signal and a second signal first signal feature data and second signal feature data related to selected time-dependent features of the said signals;

means for utilizing the said first and second signal feature data so as to produce timing difference data representative of difference between the timing of the said features of the second signal and the timing of substantially the same features of the first signal;

means producing second signal waveform data from which the waveform of the second signal can be reproduced; and means for utilizing the timing difference data so as to generate editing data determining which portions of the second signal waveform data are to be deleted and/or repeated in order to produce from the second signal waveform data further data from which there can be produced a waveform which substantially replicates the relative timing of the said features of the first signal.

10. Signal processing apparatus according to claim 9, characterised by means provided for effecting such deleting and/or repeating of portions of the second signal waveform data in accordance with the editing data.

* * * * *